US009002345B2

(12) United States Patent
Lee et al.

(10) Patent No.: US 9,002,345 B2
(45) Date of Patent: Apr. 7, 2015

(54) METHOD AND APPARATUS FOR TRANSMITTING AND RECEIVING FEEDBACK INFORMATION IN A MOBILE COMMUNICATION SYSTEM

(71) Applicant: Samsung Electronics Co., Ltd., Gyeonggi-do (KR)

(72) Inventors: Hyo-Jin Lee, Seoul (KR); Youn-Sun Kim, Gyeonggi-do (KR); Ki-Il Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 180 days.

(21) Appl. No.: 13/650,813

(22) Filed: Oct. 12, 2012

(65) Prior Publication Data

US 2013/0102304 A1    Apr. 25, 2013

Related U.S. Application Data

(60) Provisional application No. 61/546,294, filed on Oct. 12, 2011, provisional application No. 61/547,294, filed on Oct. 14, 2011, provisional application No. 61/636,989, filed on Apr. 23, 2012.

(30) Foreign Application Priority Data

Nov. 3, 2011  (KR) .......................... 10-2011-0113894
Nov. 11, 2011 (KR) .......................... 10-2011-0117483
Jan. 30, 2012 (KR) .......................... 10-2012-0008868

(51) Int. Cl.
*H04W 4/00*   (2009.01)
*H04W 24/00*  (2009.01)
*H04L 5/00*   (2006.01)

(52) U.S. Cl.
CPC ............. *H04W 24/00* (2013.01); *H04L 5/0053* (2013.01)

(58) Field of Classification Search
CPC ... H04L 1/0026; H04L 5/0048; H04L 1/0029; H04L 5/0035; H04L 25/0202; H04L 25/0204; H04L 5/0057; H04B 7/0626; H04B 7/0417; H04B 7/0617; H04B 7/0413; H04B 7/0632; H04W 24/10
USPC ........................... 455/69, 126, 422.1; 370/338
See application file for complete search history.

(56) References Cited

U.S. PATENT DOCUMENTS

| 2012/0082082 | A1* | 4/2012 | Etemad et al. ................ 370/312 |
| 2012/0140708 | A1* | 6/2012 | Choudhury et al. .......... 370/328 |

OTHER PUBLICATIONS

3rd Generation Partnership Project; Technical Specification Group Radio Access Network; Evolved Universal Terrestrial Radio Access (E-UTRA); Physical Layer Procedures (Release 10), 3GPP TS 36.213 V10.1.0, Mar. 2011.

(Continued)

*Primary Examiner* — Marcos Batista
(74) *Attorney, Agent, or Firm* — The Farrell Law Firm, P.C.

(57) ABSTRACT

A method and apparatus for transmitting feedback information by a User Equipment (UE) in a mobile communication system are provided. The method includes receiving information about at least one Channel State Information Reference Signal (CSI-RS); performing channel estimation based on the information about at least one CSI-RS; receiving information about at least one feedback; and transmitting at least one feedback including a channel estimation result using the information about at least one feedback, wherein the information about at least one feedback includes information about a transmission timing and a feedback mode for at least one feedback.

20 Claims, 12 Drawing Sheets

(56) References Cited

OTHER PUBLICATIONS

Potevio, "Signaling for CSI-RS Configuration", R1-105231, 3GPP TSG RAN WG1 Meeting #62bis, Oct. 11, 2010.

NEC Group, "Views on Wideband Long Term Feedback for SU-MIMO and MU-MIMO", R1-102265, 3GPP TSG-RAN WG1 #60bis, Apr. 12, 2010.

Fujitsu, "CSI Feedback for LTE-A with Double Codebook Structure", R1-104046, 3GPP TSG-RAN1 #61bis, Jun. 28, 2010.

Samsung, "Discussion on Multi-Point CSI Feedback for Downlink CoMP", R1-113087, 3GPP TSG RAN WG1 #66bis, Oct. 4, 2011.

Samsung, "Interference Measurement for Downlink CoMP", R1-113091, 3GPP TSG RAN WG1 #66bis, Oct. 4, 2011.

3rd Generation Partnership Project; Technical Specification Group Radio Access Network; Coordinated Multi-Point Operation for LTE Physical Layer Aspects, Sep. 2011, (Release 11), 3GPP TR 36.819 V2.0.0, Sep. 21, 2011.

Bruno Clerkx et al., Coordinated Multi-Point Transmission in Heterogeneous Networks: A Distributed Antenna System Approach, Aug. 7, 2011.

ZTE, "Discussion on Interference Measurement for CSI Feedback", R1-113011, 3GPP TSG-RAN WG1 Meeting #66bis, Oct. 7, 2011.

Fujitsu, "Consideration on CSI Feedback for DL CoMP and DL MIMO", R1-113464, 3GPP TSG RAN WG1 Meeting #66b, Oct. 5, 2011.

Huawei, Hisilicon, "Text Proposal for Standard Impacts and Design Principles of CoMP in Rel-11", R1-112042, 3GPP TSG RAN WG1 meeting #66, Aug. 17, 2011.

* cited by examiner

METHOD AND APPARATUS FOR TRANSMITTING AND RECEIVING FEEDBACK INFORMATION IN A MOBILE COMMUNICATION SYSTEM

PRIORITY

This application claims priority under 35 U.S.C. §119(a) to a U.S. patent application filed in the United States Patent and Trademark Office on Oct. 12, 2011 and assigned Ser. No. 61/546,294, a U.S. patent application filed in the U.S. Patent and Trademark Office on Oct. 14, 2011 and assigned Ser. No. 61/547,294, a Korean Patent Application filed in the Korean Intellectual Property Office on Nov. 3, 2011 and assigned Serial No. 10-2011-0113894, a Korean Patent Application filed in the Korean Intellectual Property Office on Nov. 11, 2011 and assigned Serial No. 10-2011-0117483, a Korean Patent Application filed in the Korean Intellectual Property Office on Jan. 30, 2012 and assigned Serial No. 10-2012-0008868, and a U.S. Patent Application filed in the United States Patent and Trademark Office on Apr. 23, 2012 and assigned Ser. No. 61/636,989, the entire disclosure of each of which is incorporated herein by reference.

BACKGROUND OF THE INVENTION

1. Field of the Invention

The present invention relates generally to a method and apparatus for generating feedback information in a cellular mobile communication system including a plurality of Base Stations (BSs), and more particularly, to a method and apparatus for transmitting and receiving feedback information in a Coordinated Multi-Point (CoMP) system, in which a plurality of BSs cooperate to support downlink transmission to a User Equipment (UE).

2. Description of the Related Art

Mobile communication systems have been developing into high-speed, high-quality wireless packet data communication systems to provide data services and multimedia services beyond traditional voice-oriented services.

Recently, various mobile communication standards, such as High Speed Downlink Packet Access (HSDPA) and High Speed Uplink Packet Access (HSUPA) proposed by the 3$^{rd}$ Generation Partnership Project (3GPP), High Rate Packet Data (HRPD) proposed by the 3GPP2, and 802.16 proposed by the Institute of Electrical and Electronics Engineers (IEEE), have been developed to support high-speed, high-quality wireless packet data transmission services.

The 3G wireless packet data communication systems, such as HSDPA, HSUPA and HRPD, use technologies such as Adaptive Modulation and Coding (AMC) and channel-sensitive scheduling to improve transmission efficiency. In AMC and channel-sensitive scheduling, a transmitter applies a suitable Modulation and Coding Scheme (MCS) at the most efficient time determined based on partial channel state information fed back from a receiver.

With the use of AMC, the transmitter adjusts the amount of transmission data according to the channel state. That is, in a poor channel state, the transmitter reduces the amount of transmission data to decrease a reception error probability to a desired level. In a good channel state, the transmitter increases the amount of transmission data to increase the reception error probability to a desired level, thereby ensuring efficient information transmission.

Additionally, with the use of channel-sensitive scheduling resource management, the transmitter selectively services a user having a superior channel state among several users, contributing to an increase in system capacity, compared to the case in which the transmitter allocates a channel to one user and services the user. Such an increase in system capacity is called 'multi-user diversity gain'. When AMC is used together with Multiple Input Multiple Output (MIMO), the function of determining the number of spatial layers or the rank of a transmission signal can be adopted. A wireless packet data communication system adopting AMC takes into account the number of layers for MIMO transmission as well as a coding rate and a modulation scheme in determining an optimum data rate.

In general, Orthogonal Frequency Division Multiple Access (OFDMA) is a technology that can increase capacity, as compared to Code Division Multiple Access (CDMA). One of several reasons for increasing capacity in OFDMA is that frequency-domain scheduling is possible.

With the use of channel-sensitive scheduling, a capacity gain is obtained based on a property that a channel changes over time. Likewise, more capacity gain is achieved by utilizing another property that a channel changes in frequency. In this context, replacing CDMA used in 2$^{nd}$ Generation (2G) and 3G mobile communication systems with OFDMA for future-generation systems has recently been studied. 3GPP and 3GPP2 started to work on standardization of an evolved system using OFDMA.

FIG. 1 illustrates a cellular mobile communication system in which a Transmission (Tx)/Reception (Rx) antenna is included at the center in each cell.

Referring to FIG. 1, in a cellular mobile communication system including a plurality of cells, a User Equipment (UE) receives a mobile communication service using the aforementioned techniques from a selected cell during a semi-static time period. In FIG. 1, it is assumed that the cellular mobile communication system includes three cells 100, 110 and 120 (Cell 1, Cell 2 and Cell 3). Cell 1 provides the mobile communication service to UEs 101 and 102 (UE 1 and UE 2), Cell 2 provides the mobile communication service to a UE 111 (UE 3), and Cell 3 provides the mobile communication service to a UE 121 (UE 4). Antennas 130, 131 and 132 are included at the centers of the respective cells 100, 110, and 120. The antennas 130, 131, and 132 correspond to BSs or relays.

UE 2, receiving the mobile communication service from Cell 1, is relatively far from the antenna 130, as compared to UE 1. Moreover, Cell 1 supports a relatively low data rate for UE 2 because UE 2 experiences severe interference from the antenna 132 at the center of Cell 3.

If Cell 1, Cell 2 and Cell 3 provide mobile communication services independently, they transmit Reference Signals (RSs) so that a downlink channel state is measured on a cell basis. In a 3GPP LTE-A system, a UE measures a channel state between the UE and a BS using Channel State Information-Reference Signals (CSI-RSs) and feeds back channel state information to the BS.

FIG. 2 illustrates the positions of CSI-RSs transmitted from BSs to a UE in an LTE-A system.

Referring to FIG. 2, resources available in the LTE-A system are divided into equal-size Resource Blocks (RBs). The horizontal axis and vertical axis of the resources represent time and frequency, respectively. Signals for two CSI-RS antenna ports are transmitted in the resources of each of RBs 200 to 219. That is, the BS transmits two CSI-RSs for downlink measurement to the UE in the resources of the RBs 200.

In a cellular mobile communication system including a plurality of cells as illustrated in FIG. 1, an RB at a different position is allocated to each cell and CSI-RSs are transmitted in the resources of the allocated RB. For example, in FIG. 1, Cell 1 transmits CSI-RSs in the resources of the RBs 200, Cell 2 transmits CSI-RSs in the resources of the RBs 205, and Cell 3 transmits CSI-RSs in the resources of the RBs 210. The reason for allocating different RBs (e.g., different time and frequency resources) for CSI-RS transmission to different cells is to prevent mutual interference between CSI-RSs from different cells.

A UE estimates a downlink channel using CSI-RSs, generates a Rank Indicator (RI), a Channel Quality Indicator (CQI), and a Precoding Matrix Index (PMI) as CSI of the estimated downlink channel, and feeds back the CSI to a BS. There are four modes defined for periodic CSI feedback on a Physical Uplink Control Channel (PUSCH) from a UE.

1. Mode 1-0: RI, wideband CQI (wCQI)
2. Mode 1-1: RI, wCQI, wideband PMI (wPMI)
3. Mode 2-0: RI, wCQI, subband CQI (sCQI)
4. Mode 2-1: RI, wCQI, wPMI, sCQI, sPMI The feedback timing of each piece of information in the four feedback modes is determined according to $N_{pd}$, $N_{OFFSET,CQI}$, $M_{RI}$, and $N_{OFFSET,RI}$ indicated by higher-layer signaling. In Mode 1-0, the transmission period of a wCQI is $N_{pd}$ and the feedback timing of the wCQI is determined using a subframe offset of $N_{OFFSET,CQI}$. Additionally, the transmission period and offset of an RI are $N_{pd} \cdot R_I$ and $N_{OFFSET,CQI}$+$N_{OFFSET,RI}$, respectively. Mode 1-1 and Mode 1-0 have the same feedback timing, however, a PMI is transmitted together with a wCQI at the transmitting timing of the wCQI in Mode 1-1. FIG. 3 illustrates the feedback timings of an RI, a wCQI, and a PMI in Mode 1-0 and Mode 1-1. Each transmission timing is represented as a subframe index.

In Mode 2-0, the feedback period and offset of an sCQI are $N_{pd}$ and $N_{OFFSET,CQI}$, respectively. The feedback period and offset of a wCQI are $H \cdot N_{pd}$ and $N_{OFFSET,CQI}$, respectively. Herein, $H=J \cdot K+1$, where K is a value indicated by higher-layer signaling and J is a value determined by a system bandwidth. For instance, J is 3 for a 10-MHz system. Thus a wCQI is transmitted, substituting for a sCQI at every H sCQI transmissions. The feedback period and offset of an RI are $M_{RI} \cdot H \cdot N_{pd}$ and $N_{OFFSET,CQI}$+$N_{OFFSET,RI}$ respectively. Mode 2-1 is the same as Mode 2-0 in feedback timing but different from Mode 2-0 in that a PMI is transmitted together with a wCQI at the transmission timing of the wCQI. FIG. 4 illustrates the transmission timings of an RI, an sCQI, a wCQI, and a PMI in Mode 2-0 and Mode 2-1 under the condition that $N_{pd}=2$, $M_{RI}=2$, J=3 (10 MHz), K=1, $N_{OFFSET,CQI}=1$, and $N_{OFFSET,RI}=-1$.

The above-described feedback timings are set for 4 or fewer CSI-RS antenna ports. For 8 CSI-RS antenna ports, two PMIs are fed back, unlike the above cases. For 8 CSI-RS antenna ports, Mode 1-1 is further divided into two sub-modes. A first PMI is transmitted together with an RI and a second PMI is transmitted together with a wCQI in a first submode. The feedback period and offset of the RI and the first PMI are defined as $M_{RI} \cdot N_{pd}$ and $N_{OFFSET,CQI}$+$N_{OFFSET,RI}$, respectively and the feedback period and offset of the wCQI and the second PMI are defined as $N_{pd}$ and $N_{OFFSET,CQI}$, respectively.

For 8 CSI-RS antenna ports, a Precoding Type Indicator (PTI) is added in Mode 2-1. The PTI is transmitted together with an RI in a period of $M_{RI} \cdot H \cdot N_{pd}$ with an offset of $N_{OFFSET,CQI}$+$N_{OFFSET,RI}$. If the PTI is 0, first and second PMIs and a wCQI are feedback. The wCQI and the second PMI are transmitted at the same timing in a period of $N_{pd}$ with an offset of $N_{OFFSET,CQI}$. The feedback period and offset of the first PMI are $H \cdot N_{pd}$ and $N_{OFFSET,CQI}$, respectively. H' is indicated by higher-layer signaling. On the other hand, if the PTI is 1, the PRI and the RI are transmitted together and the wCQI and the second PMI are transmitted together. The sCQI is additionally fed back. The first PMI is not transmitted. The PTI and the RI have the same feedback period and offset as those of the PTI and RI in the case in which the PTI is 0. The feedback period and offset of the sCQI are defined as $N_{pd}$ and $N_{OFFSET,CQI}$, respectively. The wCQI and the second PMI are fed back in a period of $H \cdot N_{pd}$ with an offset of $N_{OFFSET,CQI}$. H is the same as that for 4 CSI-RS antenna ports. FIGS. 5 and 6 illustrate transmission timings when PTI=0 and PTI=1 in Mode 2-1 for 8 CSI-RS antenna ports under the condition that $N_{pd}=2$, $M_{RI}=2$, J=3 (10 MHz), K=1, H'=3, $N_{OFFSET,CQI}=1$, and $N_{OFFSET,RI}=-1$.

The conventional CSI feedback technology is based on the premise that a UE transmits a single CSI feedback, without regard to a multi-CSI feedback situation for CoMP transmission, that is, simultaneous transmissions from a plurality of transmission points.

SUMMARY OF THE INVENTION

Accordingly, the present invention has been made to solve the above-stated problems occurring in the prior art, and an aspect of the present invention provides a method and apparatus for transmitting and receiving feedback information in a mobile communication system.

Another aspect of the embodiments of the present invention is to provide a multi-Channel State Information (CSI) feedback method and apparatus for Coordinated Multi-Point (CoMP) transmission in a mobile communication system.

In accordance with an embodiment of the present invention, a method for transmitting feedback information by a User Equipment (UE) in a mobile communication system is provided. The method includes receiving information about at least one Channel State Information Reference Signal (CSI-RS); performing channel estimation based on the information about at least one CSI-RS; receiving information about at least one feedback; and transmitting a feedback including a channel estimation result using the information about at least one feedback, wherein the information about at least one feedback includes information about a transmission timing and a feedback mode for the feedback.

In accordance with another embodiment of the present invention, a method for receiving feedback information by a central control device managing at least one cell in a mobile communication system is provided. The method includes transmitting information about at least one Channel State Information Reference Signal (CSI-RS) to a User Equipment (UE); transmitting information about at least one feedback to the UE; and receiving at least one feedback transmitted based on the information about at least one feedback from the UE, wherein the information about at least one feedback includes a channel estimation result generated based on the information about at least one CSI-RS and includes information about a transmission timing and a feedback mode for the at least one feedback.

In accordance with another embodiment of the present invention, a User Equipment (UE) in a mobile communication system is provided. The UE includes a transmitter; a receiver for receiving information about at least one Channel State Information Reference Signal (CSI-RS) and information about at least one feedback; and a controller for performing channel estimation based on the information about at least one CSI-RS and, upon receipt of the information about at least one feedback, controlling the transmitter to transmit at least one feedback including a channel estimation result using the information about at least one feedback, wherein the information about at least one feedback includes information about a transmission timing and a feedback mode for the at least one feedback.

In accordance with a further embodiment of the present invention, a central control device managing at least one cell in a mobile communication system is provided. The central control device includes a transmitter for transmitting information about at least one Channel State Information Reference Signal (CSI-RS) and information about at least one feedback to a User Equipment (UE); and a receiver for receiving at least one feedback transmitted based on the information about at least one feedback from the UE, wherein the information about at least one feedback includes a channel estimation result generated based on the information about at least one CSI-RS and includes a transmission timing and a feedback mode for the at least one feedback.

BRIEF DESCRIPTION OF THE DRAWINGS

The above and other aspects, objects, features and advantages of certain embodiments of the present invention will be more apparent from the following detailed description taken in conjunction with the accompanying drawings, in which.

DETAILED DESCRIPTION OF EMBODIMENTS OF THE INVENTION

While embodiments of the present invention will be described in detail in the context of an Orthogonal Frequency Division Multiplexing (OFDM) wireless communication system, especially conforming to the $3^{rd}$ Generation Partnership Project (3GPP) Evolved UMTS Terrestrial Radio Access (EUTRA) standard, it will be understood to those skilled in the art that the subject matter of the present invention is applicable to other communication systems having a similar technical background and channel configuration with a slight modification made without departing much from the scope and spirit of the present invention.

A cellular mobile communication system includes a plurality of cells in a limited area. Each cell is provided with Base Station (BS) equipment controlling mobile communication within the cell. The BS equipment provides a mobile communication service to User Equipments (UEs) within the cell. A specific UE receives the mobile communication service only from one semi-statically determined cell. This system is called a non-Coordinated Multi-Point (CoMP) system.

In the non-CoMP system, the data rates of UEs within a cell vary based on their locations in the cell. A UE at a cell center generally has a high data rate, whereas a UE at a cell edge generally has a low data rate.

The opposite concept of the non-CoMP system is a CoMP system. In a CoMP system, a plurality of cells coordinate data transmission to a UE located at a cell edge. Thus, a better-quality mobile communication service is provided to the UE, as compared to the non-CoMP system. An embodiment of the present invention provides a method and apparatus for transmitting feedback information in a CoMP system, taking into account Dynamic cell Selection (DS), Dynamic cell Selection with Dynamic Blanking (DS/DB), and Joint Transmission (JT). In DS, a UE measures a channel state on a cell basis and transmits feedback information related to the measured channel states to a BS. The BS then dynamically selects a cell that will transmit downlink data to the UE. In DS/DB, a specific cell discontinues data transmission, to mitigate interference with another cell. JT is a technique of simultaneously transmitting data from a plurality of cells to a specific UE. That is, to overcome the problems, an embodiment of the present invention designs a feedback structure so as to efficiently apply DS, DS/DB, or JT to the LTE-A system.

Figure 1:
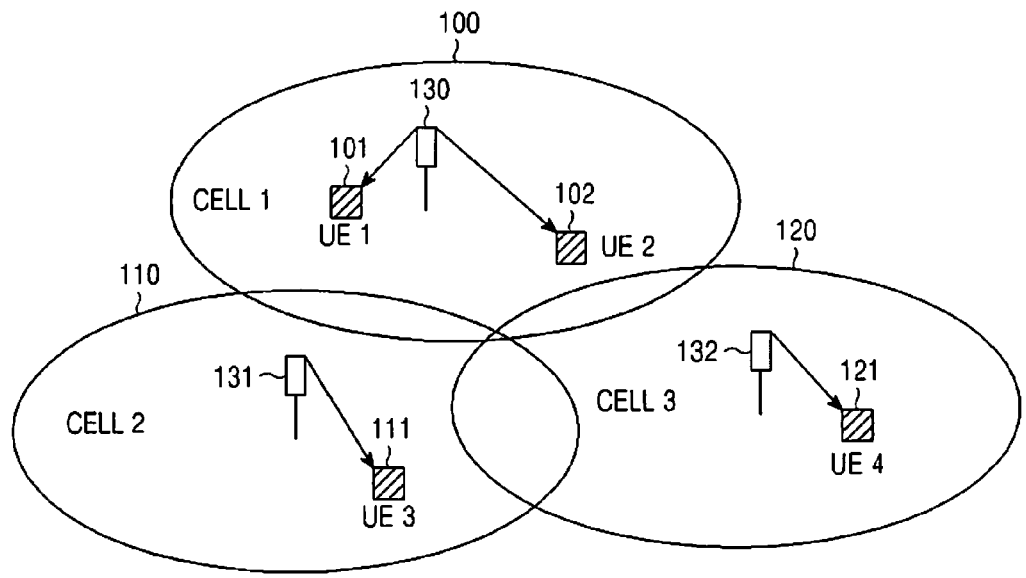
FIG. 1 illustrates a cellular mobile communication system in which a Transmission (Tx)/Reception (Rx) antenna is included at the center in each cell.
Figure 2:
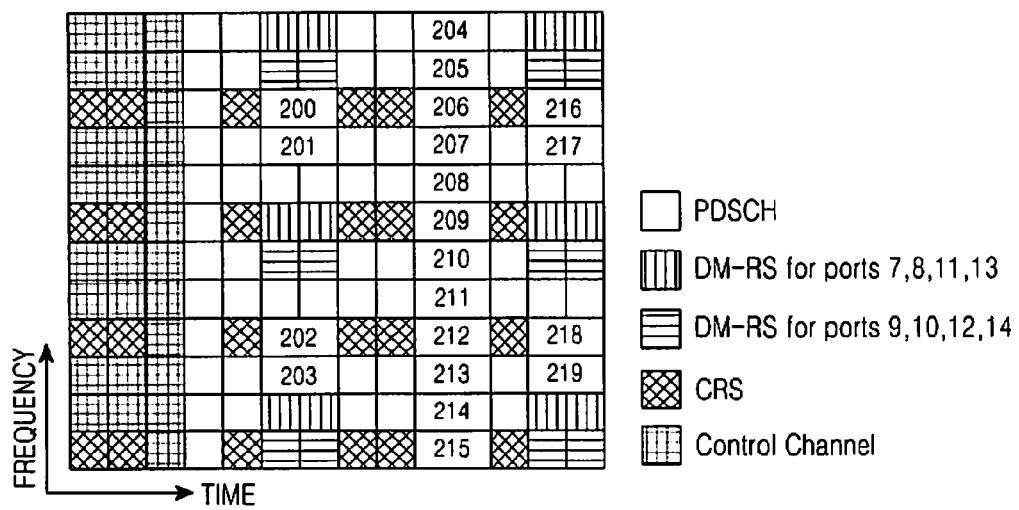
FIG. 2 illustrates the positions of Channel State Information-Reference Signals (CSI-RSs) that Base Stations (BSs) transmit to a User Equipment (UE) in a typical Long Term Evolution-Advanced (LTE-A) system.
Figure 3:
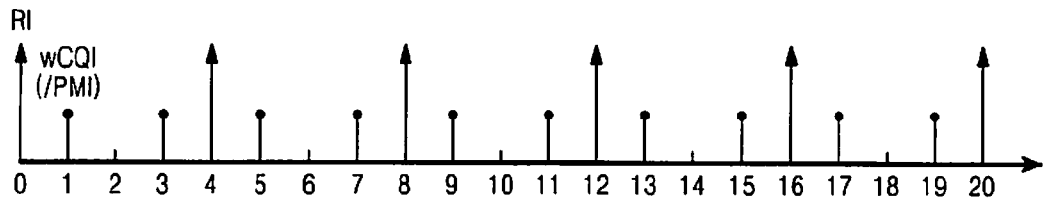
FIG. 3 illustrates feedback timings of a UE in Mode 1-0 or Mode 1-1 in the typical LTE-A system.
Figure 4:
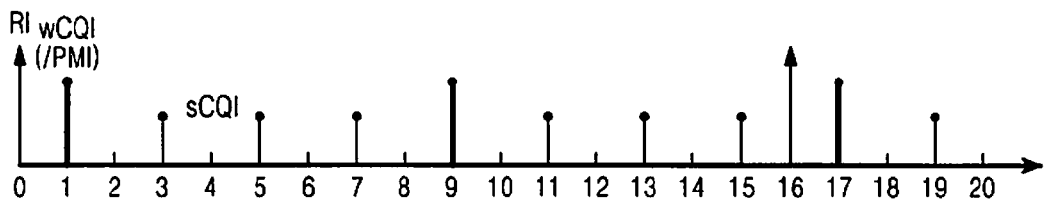
FIG. 4 illustrates feedback timings of a UE in Mode 2-0 or Mode 2-1 in the typical LTE-A system.
Figure 5:
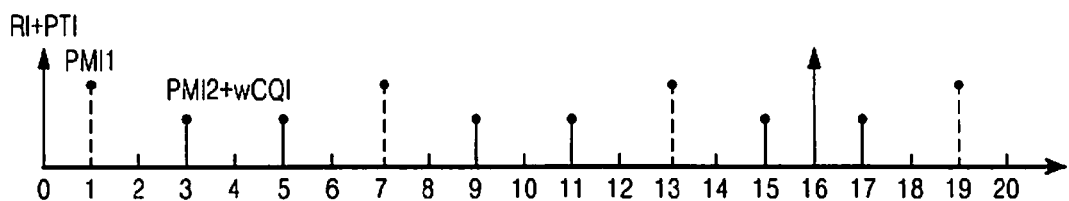
FIG. 5 illustrates feedback timings of a UE in Mode 2-1 for 8 CSI-RS antenna ports when a Precoding Type Indicator (PTI) is 0 in the typical LTE-A system.
Figure 6:
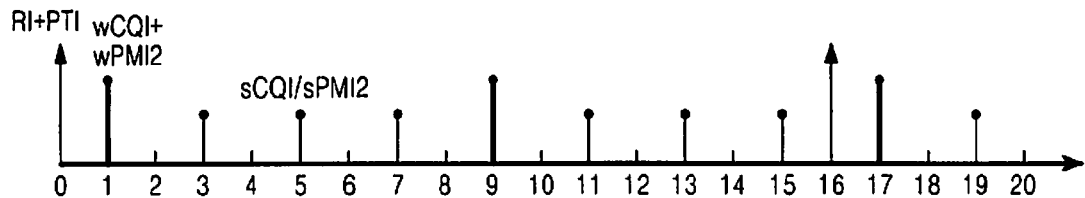
FIG. 6 illustrates feedback timings of a UE in Mode 2-1 for 8 CSI-RS antenna ports when the PTI is 1 in the typical LTE-A system.
Figure 7:
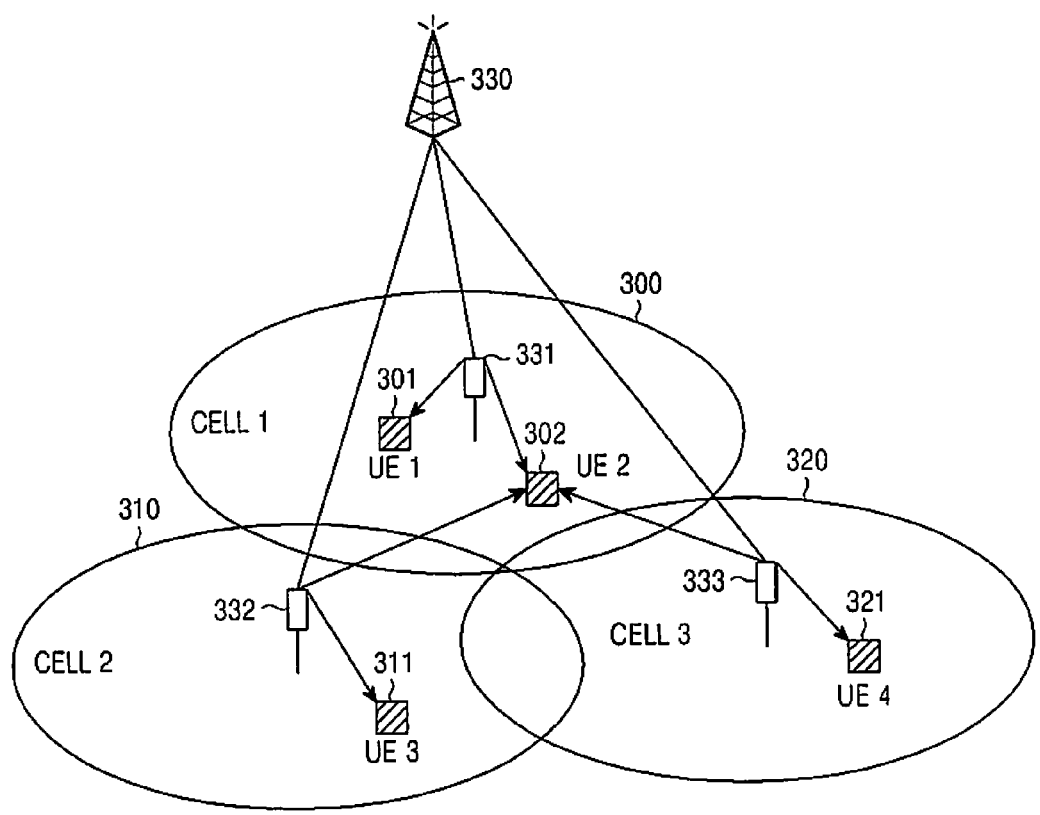
FIG. 7 illustrates the configuration of a cellular mobile communication system according to an embodiment of the present invention.

FIG. 7 illustrates the configuration of a cellular mobile communication system according to an embodiment of the present invention. In FIG. 7, it is assumed that the cellular mobile communication system includes three cells 300, 310 and 320 (Cell 1, Cell 2 and Cell 3). In an embodiment of the present invention, a cell refers to a data transmission area that a specific transmission point can service. Each transmission point is a Remote Radio Head (RRH) sharing a cell Identifier (ID) with a macro BS within a macro area or a macrocell or picocell having a different cell ID.

A central control device is a device that can transmit and receive data to and from a UE and process the transmission and received data. If each transmission point is an RRH sharing a cell ID with a macro BS, the macro BS is called a central control device. However, if each transmission point is a macrocell or a picocell having a different cell ID, a device that manages cells integrally is called a central control device.

Referring to FIG. 7, in the cellular mobile communication system, first, third and fourth UEs 301, 311 and 321 (UE 1, UE 3 and UE 4) receive data from their nearest cells among Cell 1, Cell 2 and Cell 3 and 320 and a second UE 302 (UE 2) receives data from Cell 1, Cell 2 and Cell 3 by CoMP. UE 1, UE 3 and UE 4, which receive data from their nearest cells, estimate channels using Channel State Information Reference Signals (CSI-RSs) received from the cells and transmit related feedback information to a central control device 330. However, UE 2 estimates channels received from all of Cell 1, Cell 2 and Cell 3 because it receives data from Cell 1, Cell 2 and Cell 3 by CoMP. Accordingly, the central control device 330 allocates resources for three CSI-RSs corresponding to the three cells 300, 310 and 320 to UE 2, for channel estimation of UE 2. A method for allocating CSI-RSs to UE 2 by the central control device 330 will be described below with reference to FIG. 8.

Figure 8:
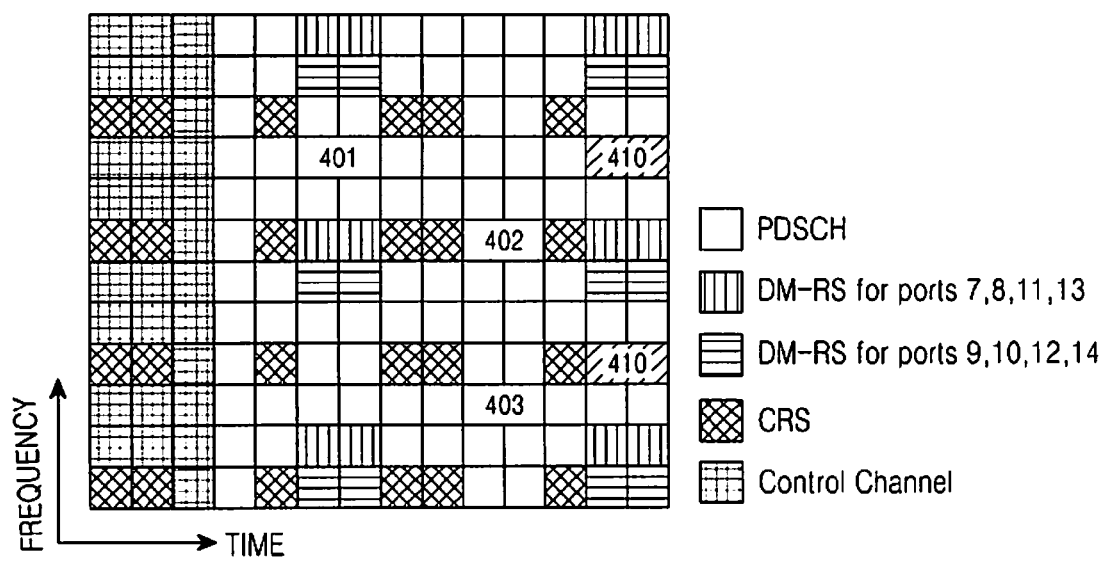
FIG. 8 illustrates the positions of CSI-RSs that BSs transmit to a UE according to an embodiment of the present invention.

FIG. 8 illustrates the positions of CSI-RSs that BSs transmit to a UE according to an embodiment of the present invention.

Referring to FIG. 8, the central control device 330 allocates resources 401, 402 and 403 to three CSI-RSs and transmits CSI-RSs in the allocated resources so that UE 2 for which CoMP transmission is supported can estimate channels from the three cells 300, 310 and 320 and channels carrying control information and system information. That is, reference numeral 401 denotes resources allocated to a CSI-RS used for channel estimation of Cell 1, reference numeral 402 denotes resources allocated to a CSI-RS used for channel estimation of Cell 2, and reference numeral 403 denotes resources allocated to a CSI-RS used for channel estimation of Cell 3. A set of resources allocated to at least one CSI-RS transmitted for channel estimation of a CoMP UE or a set of cells corresponding to the CSI-RS resources is called a measurement set.

Embodiment 1

If a measurement set including a plurality of cells is allocated to a UE, CSI feedback regarding the measurement set can be considered largely in two methods. One is to feedback CSI in a different CSI feedback mode at a different timing for each cell of the measurement set. For example, if the measurement set is {Cell-1, Cell-2, Cell-3}, a feedback mode and timing are allocated to each cell in the per-cell CSI feedback method. That is, an allocation method described in Example 1 is used:

Example 1

Cell-1: (Mode 1-1, $N_{pd}$=10, $M_{RI}$=2, $N_{OFFSET,CQI}$=0, $N_{OFFSET,RI}$=-1)
Cell-2: (Mode 1-1, $N_{pd}$=10, $M_{RI}$=2, $N_{OFFSET,CQI}$=2, $N_{OFFSET,RI}$=-1)
Cell-3: (Mode 1-1, $N_{pd}$=10, $M_{RI}$=2, $N_{OFFSET,CQI}$=4, $N_{OFFSET,RI}$=-1)

When feedback modes and timings are allocated to a CoMP UE on a cell basis as illustrated in Example 1, it is necessary to consider collision between feedback timings. In Example 1, collision can be avoided through an appropriate combination of a transmission period and an offset. However, a wrong setting of a transmission period and an offset, a carrier aggregation situation, or a Time Division Duplexing (TDD) situation can cause collision between feedback timings. According to an embodiment of the present invention, a feedback is first transmitted to a cell having the highest priority in a collision. That is, information about a cell having a higher priority is fed back first, in case one of an RI, a PMI, and a CQI collides with another. This method is advantageous in that a feedback can be transmitted without considering CoMP even in the case of feedback collision between cells and thus a UE can receive data from at least one cell without performance degradation caused by multi-feedback collision.

Cells are prioritized by signaling a measurement set and the priority levels of cells included in the measurement set to a UE by a BS and prioritizing the cells based on the priority levels of the cells by the UE. Cells can also be prioritized according to CSI-RS resource indexes for cells included in a measurement set or a higher priority level can be assigned to a cell with a shorter feedback period.

In FIG. 8, the central control device 330 allocates additional resources for interference measurement to UE 2. The amount of data that UE 2 can receive per unit time is affected by the magnitude of interference as well as the strength of a signal. Accordingly, the central control device 330 allocates an Interference Measurement Resource (IMR) configured only for interference measurement to UE 2 so that UE 2 can accurately measure interference.

The BS allocates one IMR to a UE so that the UE measures the magnitude of common interference involved in the signal components of all CSI-RSs of a measurement set. The BS can also allocate a plurality of IMRs to a UE so that the UE measures interference in various situations.

Referring to FIG. 8, UE 2 measures signals received from the three cells 300, 310, and 320 using the allocated three CSI-RS resources 401, 402 and 403, and measures interference involved in the signals received from the three cells 300, 310 and 320 using an allocated IMR 410. The BS controls signal transmissions from neighboring cells using the IMR 410 so that much of interference with UE 2 is reflected in the IMR 410.

In the case in which a measurement set including a plurality of cells and one or more IMRs are allocated to a UE, an embodiment of the present invention considers the types of feedbacks to be transmitted to a BS, a method for generating and transmitting feedback information, and a UE feedback operation for the case in which different types of feedbacks collide at a specific timing.

When a measurement set including a plurality of cells and one or more IMRs are allocated to a UE, a BS allocates a plurality of feedbacks to the UE regarding signals and interference that can be generated. The UE then generates feedback information according to the allocated feedbacks and transmits the feedback information to the BS at a predetermined feedback transmission timing.

For example, if the measurement set allocated to the UE is {CSI-RS-1, CSI-RS-2}, CSI-RS-1 and CSI-RS-2 are CSI-RSs transmitted by Cell-1 and Cell-2, respectively, the BS allocates one IMR to the UE, and the allocated IMR reflects interference from cells other than the cells of the measurement set, the BS and the UE operates as follows.

The BS allocates FeedBacks (FBs) regarding four signals and interference as illustrated in Table 1 below and the UE generates and transmits feedback information according to the allocated FBs.

TABLE 1

| | Signal component | Interference | Considerations |
|---|---|---|---|
| FB 1 | Cell-1 | IMR + Cell-2 | No blanking |
| FB 2 | Cell-1 | IMR | Blanking of Cell-2 |
| FB 3 | Cell-2 | IMR + Cell-1 | No blanking |
| FB 4 | Cell-2 | IMR | Blanking of Cell-1 |

In Table 1, IMR+Cell-2 means that the UE considers the sum of interference measured in the IMR and interference measured in CSI-RS-2 received from Cell 2 as a feedback for FB 1. That is, FB 1 indicates a CSI feedback for the case in which a signal is received from Cell-1, and Cell-2 and cells reflected in the IMR other than the cells of the measurement set cause interference. FB 2 indicates a CSI feedback for the case in which a signal is received from Cell-1 and only cells other than the cells of the measurement set cause interference because Cell-2 is in blanking state and thus does not transmit a signal. The CSI of FB 1 and FB 2 include individual RIs, PMIs and CQIs or a common RI, a common PMI, and individual CQIs.

Similarly, FB 3 and FB 4 commonly indicate a CSI feedback for the case in which a signal is received from Cell-2, and FB 3 and FB 4 are for blanking of Cell-1 and non-blanking of Cell-1, respectively. FB 3 and FB 4 have individual RIs, individual PMIs, and individual CQIs or a common RI, a common PMI, and individual CQIs. That is, FBs are designed to have a common RI and a common PMI for the same signal component and separate CQIs for different interference situations.

When the UE generates feedback information based on various signals and interference as illustrated in Table 1 and transmits the feedback information to the BS, Timing 1 to Timing 4 are assigned as the transmission timings of the feedback information as illustrated in Table 2 below. The feedback information is prioritized in order to prevent collision between the transmission timings of different feedback information. As feedback information is prioritized, feedback information with a higher priority is transmitted despite the collision between the transmission timings of feedback information, while feedback information with a lower priority is be transmitted.

TABLE 2

| | Signal component | Interference | Feedback timing | Feedback priority |
|---|---|---|---|---|
| FB 1 | Cell-1 | IMR + Cell-2 | Timing 1 | 1 |
| FB 2 | Cell-1 | IMR | Timing 2 | 3 |
| FB 3 | Cell-2 | IMR + Cell-1 | Timing 3 | 2 |
| FB 4 | Cell-2 | IMR | Timing 4 | 4 |

To prevent collision between the transmission timings of a plurality of pieces of feedback information, the feedback information is prioritized in various methods. One method of prioritizing feedbacks is for a BS to prioritize feedback information according to the priority index of the feedback information.

For example, when the priority indexes illustrated in the last column of Table 2 are assigned to a plurality of FBs and a collision occurs between the transmission timings of FB 1 with priority index 1 and FB 2 with priority index 3, the UE transmits a CSI feedback of FB 1 without transmitting a CSI feedback of FB 2.

The BS transmits feedback priority indexes to the UE by RRC signaling as illustrated in the last column of Table 2 or FBs are prioritized in the order of FB allocation numbers without assigning additional priority indexes. That is, if FB 1 collides with FB 2, a feedback for FB 1 is transmitted with priority at a given timing, while a feedback for FB 2 is not transmitted. To generalize this operation, for indexes m and n (where m>n), a feedback is transmitted always for FB m, while a feedback is not transmitted for FB n, at a colliding transmission timing.

Another method of prioritizing FBs is that feedback priorities are determined based on CSI-RS resource indexes corresponding to signal components for which feedback information is configured. That is, when a collision occurs between the transmission timings of two pieces of feedback information, the UE transmits feedback information with a lower CSI-RS resource index, while not transmitting feedback information with a higher CSI-RS resource index. For example, in Table 2, if the CSI-RS resource indexes for Cell-1 and Cell-2 are 1 and 2, respectively, feedback information for Cell-1 is transmitted with priority over feedback information for Cell-2.

A third method for prioritizing feedback information is to determine the priority level of feedback information according to the type of interference involved in the feedback information. Feedback information for a case in which interference is measured only in an IMR has priority over feedback information for a case in which interference is measured in a plurality of resources such as "IMR+Cell-1", as illustrated in Table 2. In the opposite case, a case in which interference is measured in more resources has a higher feedback priority level than a case where interference is measured in fewer resources. Or the BS assigns priority indexes according to interference types and thus feedbacks are prioritized based on the assigned priority indexes. For example, when the BS assigns index 1 to a case where the UE measures interference only in an IMR and index 1 to a case where the UE considers both interference in the IMR and interference with Cell-1 in Table 2, the UE prioritizes feedbacks according to the interference indexes.

Table 3 below illustrates a situation in which a set of two IMRs {IMR 1, IMR 2} and a plurality of related FBs are assigned to a UE. IMR 1 and IMR 2 represent interference measurement resources reflecting different interference situations. Another method of prioritizing feedbacks according to interference types is to give a higher priority level to feedback information with a lower IMR index than feedback information with a higher IMR index, when a BS assigns a plurality of IMRs to a UE as illustrated in Table 3. For example, feedback information of FB 1 with a lower IMR index (e.g., IMR 1) is transmitted, while feedback information of FB 2 with a higher IMR index (e.g., IMR 2) is not transmitted, at a transmission timing at which FB 1 collides with FB 2 in Table 3.

TABLE 3

| | Signal component | Interference | Feedback timing |
|---|---|---|---|
| FB 1 | Cell-1 | IMR 1 | Timing 1 |
| FB 2 | Cell-1 | IMR 2 | Timing 2 |
| FB 3 | Cell-2 | IMR 1 | Timing 3 |
| FB 4 | Cell-2 | IMR 2 | Timing 4 |

A final method of prioritizing feedbacks uses the aforedescribed two feedback prioritizing methods (i.e. the CSI-RS resource index-based feedback prioritizing method and the method of prioritizing feedbacks according to interference types) in combination. When a collision occurs between the transmission timings of two feedbacks, feedback information with a lower CSI-RS resource index is transmitted with priority. However, if the two feedbacks have the same CSI-RS resource index, they are prioritized based on interference types.

However, if a collision occurs between the transmission timings of two feedbacks, the feedbacks are prioritized based on interference types involved in the feedbacks. However, if the two feedbacks have the same interference type, feedback information with a lower CSI-RS resource index is transmitted with priority.

If the former method is adopted in a DB system, a BS first receives a feedback for a situation in which a UE receives data from a specific cell in various interference situations. However, if the latter method is adopted in a DS system, a BS first receives a feedback for a situation where a UE receives data from different cells in the same interference situation.

In the methods of prioritizing feedbacks in the case of a collision between the transmission timings of the feedbacks, RI transmission has priority over wCQI or wCQI/PMI transmission, or wCQI or wCQI/PMI transmission has priority over sCQI transmission, at a transmission timing at which feedbacks with the same feedback priority levels collide.

However, the above-described feedback prioritizing methods are used only at a transmission timing at which the same type of feedback information collides, in such a manner that a higher priority level is given to RI transmission than wCQI or wCQI/PMI transmission and a higher priority level is given to wCQI or wCQI/PMI transmission than sCQI transmission.

Another method for transmitting CSI feedbacks regarding a measurement set assigned to a UE is to divide the measurement set into one or more subsets and setting a CSI feedback mode and timing for each subset, for CSI feedback. In a method for transmitting a CSI feedback on a subset basis, a UE-Preferred cell Index (PI) is included on a subset basis and only a feedback for a cell corresponding to the PI is transmitted. PI-including feedback methods according to Embodiments 2, 3 and 4 will be described below in conjunction with DS, DS/DB, and JT.

Embodiment 2

Another embodiment of the present invention provides a method for transmitting feedbacks in allocated feedback modes at allocated timings at a CoMP UE in a cellular mobile communication system using DS.

In this embodiment, a BS indicates a measurement set and a plurality of subsets of the measurement set to a UE and allocates a feedback mode and timing for each subset to the UE. For instance, assuming that the measurement set is {Cell-1, Cell-2, Cell-3, Cell-4} and the BS wants to receive CSI for UE-preferred two cells among the cells of the allocated measurement set, the BS allocates two feedback modes and timings to the UE and indicates a subset corresponding to the respective feedback modes and timings to the UE. In the example, the following two feedback modes and timings and the subsets corresponding to the feedback modes and timings are set:

Example 2

Feedback allocation 1: (Mode A, $N_{pd}=10$, $M_{RI}=2$, $M_{PI}=2$, $N_{OFFSET,CQI}=0$, $N_{OFFSET,RI}=-1$, $N_{OFFSET,PI}=-1$, {Cell-1, Cell-2, Cell-3, Cell-4})

Feedback allocation 2: (Mode A, $N_{pd}=10$, $M_{RI}=2$, $M_{PI}=2$, $N_{OFFSET,CQI}=3$, $N_{OFFSET,RI}=-1$, $N_{OFFSET,PI}=-1$, {Cell-1, Cell-2, Cell-3, Cell-4})

In Example 2, Mode A indicates that feedback information transmitted from a UE includes a PI in addition to conventionally included RI, PMI, and CQI information. $M_{PI}$ and $N_{OFFSET,PI}$ are parameters representing the feedback period and offset of the PI, respectively, which can be defined as PI period=RI_period×$M_{PI}$
PI offset=RI_offset+$N_{OFFSET,PI}$ where $N_{OFFSET,PI}$ is an integer ranging from 0 to $-N_{pd}+1$. Alternatively or additionally, the PI is encoded jointly with the RI and transmitted to the BS without the need for separately defining the period and offset of the PI.

Another method for defining the feedback timing of a PI is to set the period of the PI to a multiple of a wCQI period independently of the timing of an RI and apply an additional offset. That is, the period and offset of the PI are defined as PI period=wCQI_period×$M_{PI}$
PI offset=wCQI_offset+$N_{OFFSET,PI}$ In the above case, the period and offset of the PI are set to $N_{pd}\cdot P_I$ and $N_{OFFSET,CQI}+N_{OFFSET,PI}$, respectively in Example 2. When a PI is added to the conventional Mode 2-0 in which an sCQI is defined, the period and offset of the PI are set to $N_{pd}\cdot H\cdot M_{PI}$ and $N_{OFFSET,CQI}+N_{OFFSET,PI}$, respectively. In the case in which the period of a PI is set to a multiple of the period of a wCQI and instead of an RI, a CQI/PMI is transmitted shortly after the PI, a CQI/PMI related to the latest RI and PI or a CQI/PMI set assuming a fixed RI is fed back. The fixed RI is for rank 1, which offers the benefit of ensuring a normal operation when an available RI is different for each cell. That is, if a first cell supports up to rank 4 and a second cell merely supports rank 2, an RI feedback for the first cell is not applied to the second cell. The smaller value between a rank for the latest RI feedback and a maximum rank available in a cell related to a new PI is another assumption for an RI in generating a CQI/PMI, when the CQI/PMI, not the RI, is transmitted shortly after a PI. The maximum available rank in the cell related to the new PI is based on a CSI-RS antenna port setting or is a maximum rank freely set by the BS. The following three assumptions can be summarized for an RI in generating a CQI/PMI in the situation in which the CQI/PMI is transmitted, instead of the RI, shortly after a PI:

the latest feedback RI value;
a fixed RI value (the rank is set to 1); and
the minimum between the latest feedback RI value and a maximum rank for a new PI.

In feedback allocation 2 of Example 2, the constraint that a PI is selected after a PI selected in feedback allocation 1 is excluded from an allocated subset is imposed. A UE feeds back different information according to the number of CSI-RS antenna ports in the cell indicated by a PI. For example, if Cell-1 has 8 antenna ports, each of the other cells has 4 or fewer antenna ports, and a PI indicates Cell-1, feedback information includes two types of PMIs or PTIs in addition to an RI and a CQI corresponding to the 8 antennas. However, if the PI indicates Cell-2, the feedback information has to only include an RI, a CQI, and one type of PMI. The PI occupies 1 or more bits. Table 4 illustrates an example of the indexes of cells indicated by a 2-bit PI.

TABLE 4

| PI field | Cell index |
| --- | --- |
| 00 | 1 |
| 10 | 2 |
| 11 | 3 |
| 01 | 4 |

In another example, if a measurement set is {Cell-1, Cell-2, Cell-3, Cell-4} and the BS wants to get information about one preferred cell between Cell-1 and Cell-2 and information about one preferred cell between Cell-3 and Cell-4, the BS allocates feedbacks as follows:

Example 3 feedback allocation 1: (Mode A, $N_{pd}=10$, $M_{RI}=2$, $M_{PI}=2$, $N_{OFFSET,CQI}=0$, $N_{OFFSET,RI}=-1$, $N_{OFFSET,PI}=-1$, {Cell-1, Cell-2})

feedback allocation 2: (Mode A, $N_{pd}$=10, $M_{RI}$=2, $M_{PI}$=2, $N_{OFFSET,CQI}$=3, $N_{OFFSET,RI}$=−1, $N_{OFFSET,PI}$=−1, {Cell-3, Cell-4})

Figure 9:
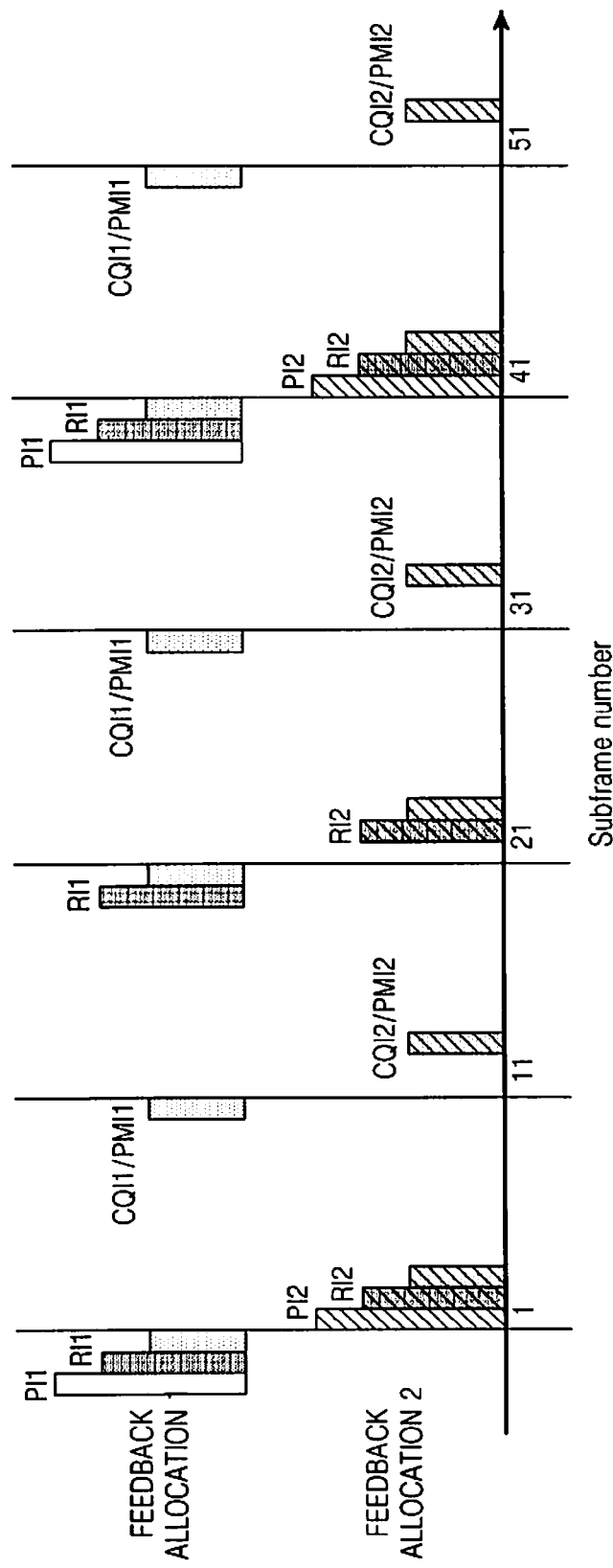
FIG. 9 illustrates feedback timings of a UE according to another embodiment of the present invention.

As in Example 2, a PI has an independent feedback timing and is jointly encoded with an RI for transmission in Example 3. A set of cells corresponding to each feedback is transmitted together with feedback allocations to a UE, independently of a measurement set or is transmitted to the UE as bitmap information of the measurement set. If a bitmap is used for Example 3, the BS transmits a bitmap sequence [1, 1, 0, 0] regarding the measurement set in feedback allocation 1 and a bitmap sequence [0, 0, 1, 1] regarding the measurement set in feedback allocation 2. FIG. 9 illustrates feedback transmission timings and feedback information of a UE regarding two feedback allocations in Example 3 and Example 4. Example 3 and Example 4 are extensions of the conventional Mode 1-1 for 4 or fewer CSI-RS antenna ports. When Mode 2-1 is extended, the BS additionally transmits K to the UE. Similarly, the period of a PI is also set to an $M_{PI}$ multiple of an RI period and the offset of the PI is set to the sum of an RI offset and $N_{OFFSET,PI}$. Or the PI is jointly encoded with the RI without additionally defining a PI timing. Additionally, the period and offset of the PI is set to an $M_{PI}$ multiple of a WCI period and the sum of a wCQI offset and $N_{OFFSET,PI}$, respectively. In a feedback mode for 8 CSI-RS antenna ports, including two types of PMIs and two types of PTIs additionally, a UE feeds back a PI additionally in the conventional feedback structure as in Example 2 and Example 3.

In another example, if the measurement set is {Cell-1, Cell-2, Cell-3, Cell-4} and the BS always wants to get channel information about Cell-1 and information about a UE-preferred cell from among Cell-2, Cell-3 and Cell-4, the BS allocates feedbacks as follows:

Example 4 feedback allocation 1: (Mode 1-1, $N_{pd}$=10, $M_{RI}$=2, $N_{OFFSET,CQI}$=0, $N_{OFFSET,RI}$=−1, {Cell-1})
feedback allocation 2: (Mode A, $N_{pd}$=10, $M_{RI}$=2, $N_{OFFSET,CQI}$=3, $N_{OFFSET,RI}$=−1, {Cell-2, Cell-3, Cell-4})

In Example 4, since a cell set includes a single element in feedback allocation 1, there is no need to define a PI period. When a cell set includes only one element in a feedback allocation, a PI period is not defined, or even though a PI period is defined, a PI is not fed back.

In accordance with an embodiment of the present invention, since a UE feeds back channel information about a plurality of cells at different transmission timings, a collision occurs between the transmission timings of the channel information. A feedback for a feedback allocation having a higher priority is always transmitted first. That is, when one of an RI, a PMI, and a CQI collides with another, information for a higher-priority feedback allocation is first fed back. This method enables a UE to receive data from at least one cell without performance degradation caused by multi-feedback collision, despite collision between cells. Cells are prioritized by signaling priority information together with feedback allocations to a UE by a BS and determining feedback priority levels according to the priority information by the UE. Or, the priority levels of cells are determined based on the indexes of feedback allocations. Or, a higher priority level is assigned to a feedback allocation having the shortest feedback period.

If a PI cannot be transmitted due to a timing collision, a subsequent RI, PMI and CQI is fed back based on a preset PI value. The PI value is indicated to the UE by higher-layer signaling or is determined to be a feedback for a cell having the smallest index in a cell set in a feedback allocation. When an RI cannot be transmitted, a PMI and a CQI are calculated on the same assumption as non-PI transmission. Consequently, the feedback prioritization methods according to the first embodiment of the present invention are performed in a similar manner in the second embodiment of the present invention.

Embodiment 3

A third embodiment of the present invention provides a method for transmitting a feedback in an allocated feedback mode at an allocated timing at a CoMP UE in a cellular mobile communication system using DS/DB.

To implement DS/DB, a UE feeds back to a BS both channel information in case of Interference Cell (I-cell) off and channel information in case of I-cell on. These two feedbacks are performed independently. However, since an RI and PMI representing spatial information between the UE and a specific cell do not change much in both cases, the RI and PMI are set to the same values in both cases and different CQI values are set in both cases.

For example, after feedback information for the case of I-cell-on is set as a primary feedback or reference feedback, an RI and PMI for the case of I-cell off are set to the RI and PMI of the primary feedback (i.e. the reference feedback). The UE calculates a CQI for the case of I-cell off based on at least one of the set RI and PMI, thus setting the CQI separately from a CQI for the case of I-cell on. As the same RI and PMI are set in both I-cell off case and I-cell-on case, channel information for the I-cell off case may includes only the CQI.

A UE acquires channel information in the case of I-cell off and in the case of I-cell on in two methods. One of the channel information acquisition methods is that a BS notifies a UE of the index of an I-cell along with a measurement set. For example, if the BS indicates {Cell-1, Cell-2, Cell-3} as the measurement set and Cell-1 as an I-cell, the UE has only to feed back channel information only for an I-cell off case regarding Cell-1. Moreover, the UE should feed back channel information for Cell-1 off and Cell-1 in cases regarding Cell-2 and Cell-3. Regarding Cell-2 and Cell-3, a common RI and PMI and two different CQIs are fed back for both Cell-1 on and Cell-1 off cases. Let a CQI for the I-cell on case be called a DS-CQI and a CQI for the I-cell off case be called a DB-CQI. The DS-CQI and the DB-CQI are fed back at the same or different timings. In the former case, the DB-CQI is fed back as a separate value or a delta_DB-CQI being the difference from the DS-CQI is fed back. If the RI is 1, a CQI for one codeword is fed back. Then, the delta_DB-CQI is defined simply as (DB-CQI−DS-CQI). However, if the RI is 2 or higher, CQIs for two codewords should be fed back. In the conventional LTE-Advanced technology, a CQI for the second codeword is fed back as the difference from the CQI for the first CQI. That is, when DS-CQIs for the first and second codewords are respectively called DS-CQI_CW1 and DS-CQI_CW2, the DS-CQI_CW1 and a delta_DS-CQI_CW2 are fed back conventionally. Herein, delta_DS-CQI_CW2=DS-CQI_CW2−DS-CQI_CW1. If CQIs for two codewords are needed and DB-CQIs for the first and second codewords are DB-CQI_CW1 and DB-CQI_CW2, respectively, a common delta_DB-CQI is transmitted for the two codewords and used as follows:

DB-CQI_CW1=DS-CQI_CW1+delta_DB-CQI
DB-CQI_CW2=DS-CQI_CW2+delta_DB-CQI

For the two codewords, delta_DB-CQI_CW1 and delta_DB-CQI_CW2 are fed back respectively and used as follows.

DB-CQI_CW1=DS-CQI_CW1+delta_DB-CQI_CW1
DB-CQI_CW2=DS-CQI_CW2+delta_DB-CQI_CW2

As in the second embodiment of the present invention, a BS notifies a UE of a measurement set and a plurality of subsets of the measurement set and allocates a feedback mode and timing for each subset to the UE in the third embodiment of the present invention. However, the third embodiment of the present invention differs from the second embodiment of the present invention in that a DB-CQI or delta_DB-CQI is included in each feedback. For example, if the measurement set is {Cell-1, Cell-2, Cell-3, Cell-4}, an I-cell is Cell-1, and the BS wishes to receive channel information about two UE-preferred cells selected from the measurement set and to receive a delta_DB-CQI and a DS-CQI at the same timing, the BS allocates two feedback modes and timings to the UE and indicates a subset of the measurement set corresponding to the feedback modes and timings to the UE. In this example, the two feedback modes and timings and the subset are set as follows.

Example 5 feedback allocation 1: (Mode B, $N_{pd}$=10, $M_{RI}$=2, $M_{RI}$=2, $N_{OFFSET,CQI}$=0, $N_{OFFSET,RI}$=−1, $N_{OFFSET,PI}$=−1, {Cell-1, Cell-2, Cell-3, Cell-4})

feedback allocation 2: (Mode B, $N_{pd}$=10, $M_{RI}$=2, $M_{PI}$=2, $N_{OFFSET,CQI}$=3, $N_{OFFSET,RI}$=−1, $N_{OFFSET,PI}$=−1, {Cell-1, Cell-2, Cell-3, Cell-4})

Figure 10:
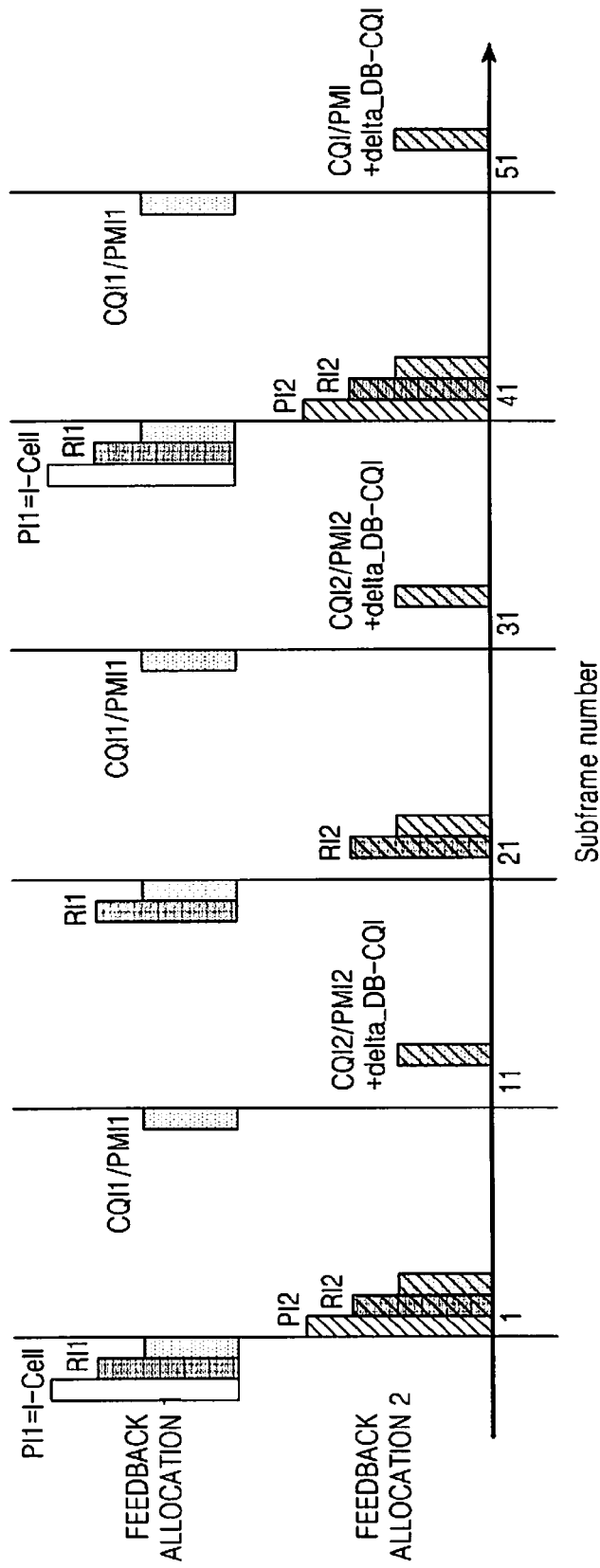
FIG. 10 illustrates feedback timings of a UE according to a third embodiment of the present invention.

In Example 5, unlike Mode A of Example 2, Mode B indicates that feedback information to be transmitted from the UE includes a delta_DB-CQI in addition to a conventionally transmitted RI, PMI, and CQI, and a PI. The delta_DB-CQI is jointly encoded with a DS-CQI and fed back at the same timing. That is, the transmission period and offset of the DS-CQI and the delta_DB-CQI are set to $N_{pd}$ and $N_{OFFSET,PI}$, respectively. If the PI indicates an I-cell, a DB-CQI is not needed. Therefore, the delta_DB-CQI is set to 0 or not transmitted, while only the DS-CQI is transmitted. FIG. 10 illustrates feedback transmission timings and feedback information of a UE in two feedback allocations, when a PI indicates an I-cell in feedback allocation 1 and the PI indicates a cell other than the I-cell in feedback allocation 2. Example 5 is an extension of the conventional Mode 2-1. When Mode 2-1 is extended, the BS will additionally transmit K to the UE. Likewise, the period of a PI is set to an $M_{PI}$ multiple of an RI period and the offset of the PI is set to the sum of an RI offset and $N_{OFFSET,PI}$. Or, the PI is jointly encoded with the RI and transmitted together without defining an additional PI timing. The period and offset of a PI for a wCQI are defined, respectively, as an $M_{PI}$ multiple of the period of the wCQI and the sum of the offset of the wCQI and $N_{OFFSET,PI}$. In an extension of Mode 2-1, a delta_DB-CQI is defined for each of a wCQI and an sCQI and transmitted together with a DS-CQI, or a delta_DB-CQI is defined for one of the wCQI and the sCQI and transmitted together with a DS-CQI at a given timing. In a feedback mode for 8 CSI-RS antenna ports, which additionally includes two types of PMIs and two types of PTIs, the UE additionally feeds back a PI and a delta_DB-CQI in the conventional feedback structure in the same manner as in Example 5.

In another example, if the measurement set is {Cell-1, Cell-2, Cell-3, Cell-4} and an I-cell is Cell-1 and the BS wants to receive channel information about two UE-preferred cells selected from the measurement set and to receive a DB-CQI and a DS-CQI at different timings, the BS configures two feedback modes, timing information about the transmission timing of the DB-CQI, and a subset of the measurement set corresponding to the feedback modes and timing, as follows.

Example 6 feedback allocation 1: (Mode C, $N_{pd}$=10, $M_{RI}$=2, $M_{PI}$=2, H"=2, $N_{OFFSET,CQI}$=0, $N_{OFFSET,RI}$=−1, $N_{OFFSET,PI}$=−1, {Cell-1, Cell-2, Cell-3, Cell-4})

feedback allocation 2: (Mode C, $N_{pd}$=10, $M_{RI}$=2, $M_{PI}$=2, H"=2, $N_{OFFSET,CQI}$=3, $N_{OFFSET,RI}$=−1, $N_{OFFSET,PI}$=−1, {Cell-1, Cell-2, Cell-3, Cell-4})

Figure 11:
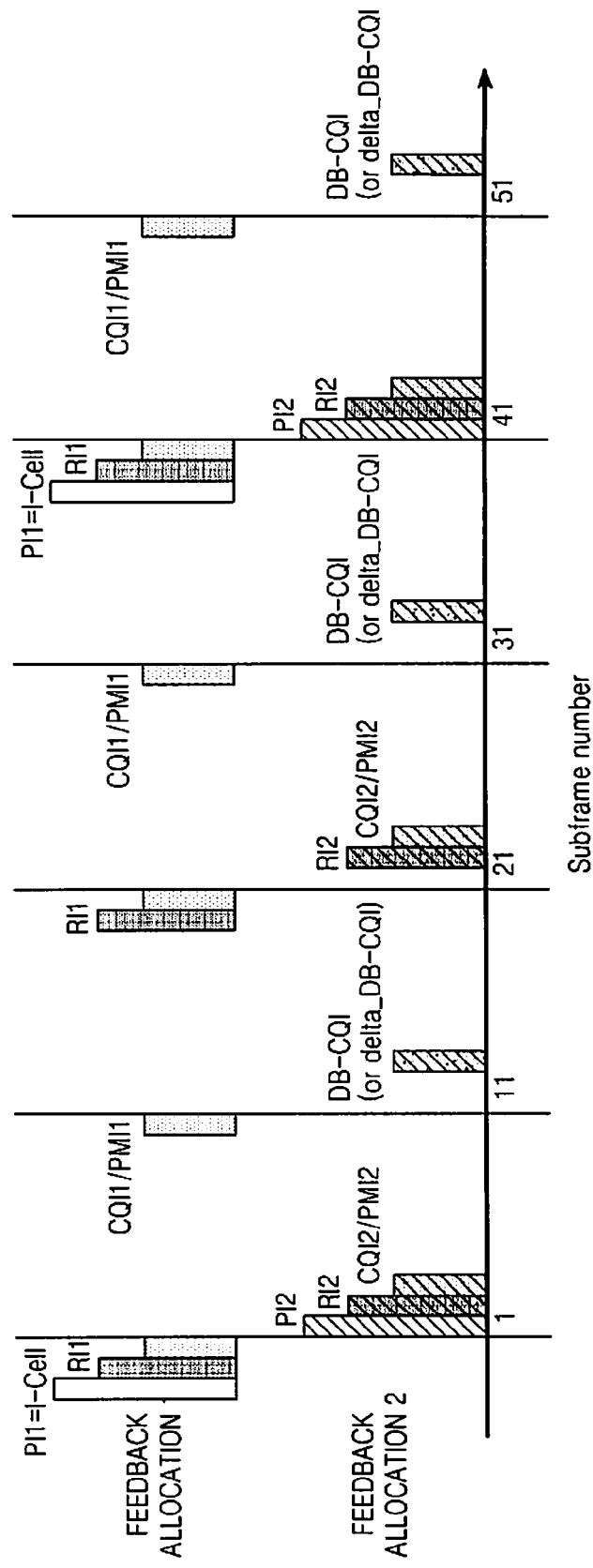
FIG. 11 illustrates feedback timings of a UE according to the third embodiment of the present invention.

In Example 6, Mode C includes a parameter H" indicating the period of a DB-CQI, compared to Mode B of Example 5. The transmission period and offset of the DB-CQI are set to $H"·N_{pd}$ and $N_{OFFSET,CQI}$, respectively. That is, in the situation in which the DS-CQI is transmitted in a period of $N_{pd}$, a DB-CQI is transmitted every H" times. Instead of the DB-CQI, a delta_DB-CQI is transmitted. Moreover, in Example 6, when the PI indicates an I-cell, the DB-CQI is not needed and thus only the DS-CQI is transmitted. FIG. 11 illustrates feedback transmission timings and feedback information of a UE in two feedback allocations, when a PI indicates an I-cell in feedback allocation 1 and the PI indicates a cell other than the I-cell in feedback allocation 2. Example 6 is an extension of the conventional Mode 1-1. When Mode 2-1 is extended, the BS additionally transmits K to the UE. Likewise, the period of a PI is set to an $M_{PI}$ multiple of an RI period and the offset of the PI is set to the sum of an RI offset and $N_{OFFSET,PI}$. Or, the PI is jointly encoded with the RI and transmitted together without defining an additional PI timing. The period and offset of a PI for a wCQI are defined respectively as an $M_{PI}$ multiple of the period of the wCQI and the sum of the offset of the wCQI and $N_{OFFSET,PI}$. In an extension of Mode 2-1, a DB-CQI is defined for each of a wCQI and an sCQI and transmitted together with a DS-CQI, or a DB-CQI is defined for one of the wCQI and the sCQI and transmitted together with a DS-CQI at a given timing. The transmission timing of a DB-sCQI, i.e. a DB-CQI for an sCQI, is set such that (H−1) DB-sCQIs are transmitted at an interval of $N_{pd}$ subframes after a timing of the transmission period of a DB-wCQI, i.e. a DB-CQI for a wCQI, $H"·N_{pd}$ and the offset $N_{OFFSET,CQI}$.

Figure 12:
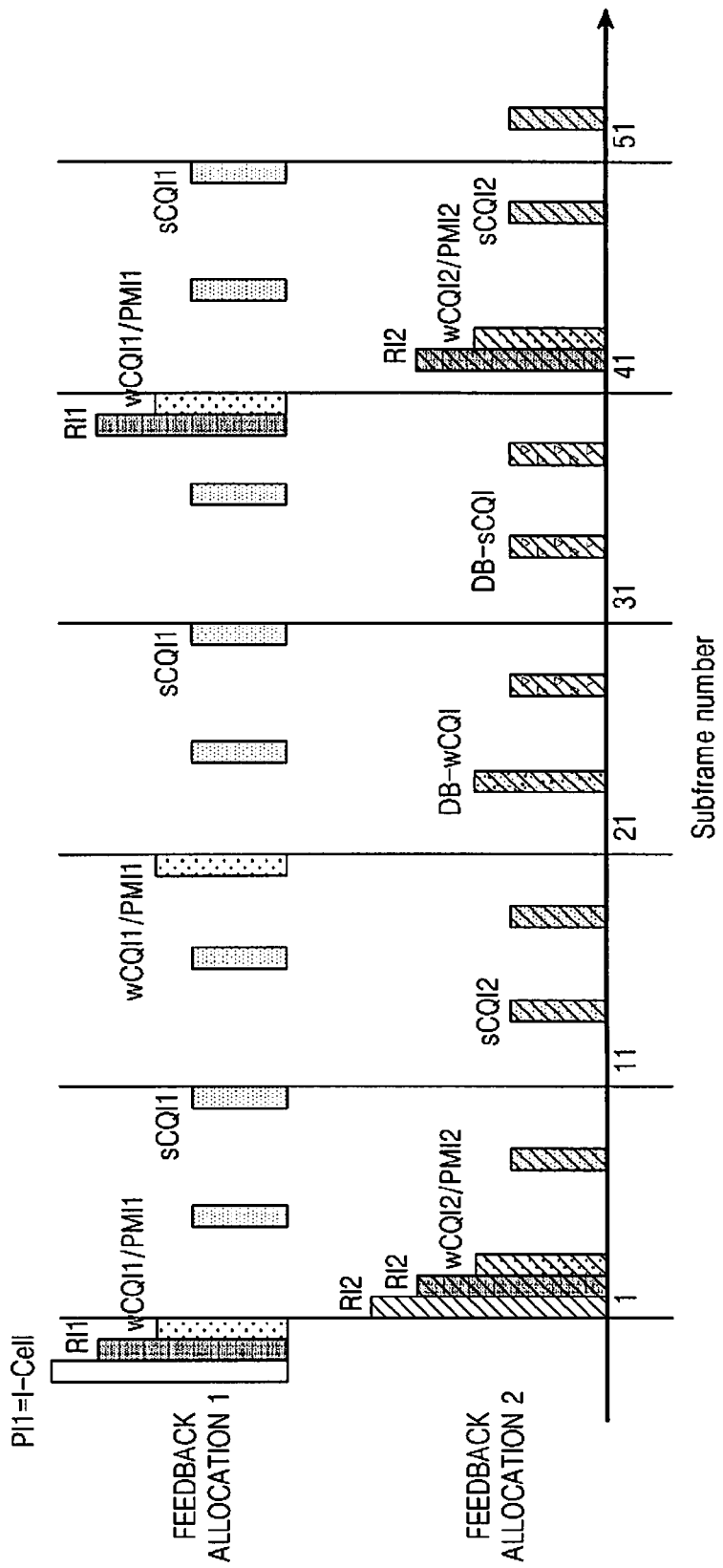
FIG. 12 illustrates feedback timings of a UE according to the third embodiment of the present invention.

Example 7 is an example of available feedback allocations, when a DB-CQI is transmitted by extending Mode 2-1. FIG. 12 illustrates feedback transmission timings and feedback information of a UE in two feedback allocations, when a PI indicates an I-cell in feedback allocation 1 and the PI indicates a cell other than the I-cell in feedback allocation 2.

Example 7 feedback allocation 1: (Mode D, $N_{pd}$=5, $M_{RI}$=2, $M_{PI}$=2, J=3 (10 MHz), K=1, H"=2, $N_{OFFSET,CQI}$=0, $N_{OFFSET,RI}$=−1, $N_{OFFSET,PI}$=1, {Cell-1, Cell-2, Cell-3, Cell-4})

feedback allocation 2: (Mode D, $N_{pd}$=5, $M_{RI}$=2, $M_{PI}$=2, J=3 (10 MHz), K=1, H"=2, $N_{OFFSET,CQI}$=3, $N_{OFFSET,RI}$=−1, $N_{OFFSET,PI}$=−1, {Cell-1, Cell-2, Cell-3, Cell-4})

In Example 7, Mode D is a new feedback mode that is an extension of the conventional Mode 2-1 requiring additional transmission of a DB-CQI. In a feedback mode for 8 CSI-RS antenna ports, including two types of PMIs and two types of PTIs additionally, a UE feeds back a PI and a DB-CQI additionally in the conventional feedback structure in the same manner as in Example 7.

Another method for acquiring CSI, i.e. a DB-CQI and a DS-CQI in both I-cell on and I-cell off cases at a UE is that a BS indicates an IMR for each cell as well as a measurement set to the UE. That is, when the BS signals CSI-RS resources for signal measurement, an IMR for an I-cell on case, and an IMR for an I-cell off case regarding each cell of the measurement set to the UE, the UE acquires both a DB-CQI and a DS-CQI for the cell based on channel information acquired from the resources. For a cell in which only one IMR is known, the UE only has to calculate a DS-CQI.

For example, if the BS allocates {Cell-1, Cell-2, Cell-3} as the measurement set and indicates to the UE one IMR for Cell-1 and two IMRs for each of Cell-2 and Cell-3, the UE feeds back one piece of channel information for Cell-1 and channel information for two cases for each of Cell-2 and Cell-3. The RI and PMI included in the channel information about two IMRs for each of Cell-2 and Cell-3 are set to the same values. Different CQIs are generated for the two cases based on at least one of the set RI and PMI. If the smaller between two CQIs is set as a DS-CQI and the larger CQI is set as a DB-CQI, the DS-CQI and the DB-CQI are fed back to the BS in a specific feedback mode at a specific timing. The feedback mode and timing are set in the methods described in Example 5, Example 6, and Example 7.

The UE classifies two pieces of channel information generated for each of Cell-2 and Cell-3 into primary CSI and secondary CSI. For instance, the UE sets channel information including the smaller between two CQIs as primary CSI and the other channel information as secondary CSI. The RI and PMI included in the secondary CSI are set to the same values as the RI and PMI included in the primary CSI, and a CQI for the secondary CSI is calculated to be feedback based on at least one of the set RI and PMI. Since the RI and PMI of the secondary CSI are set based on the RI and PMI of the primary CSI, the primary CSI is used as a reference CSI for the secondary CSI.

Embodiment 4

A fourth embodiment of the present invention provides a method for transmitting a feedback in an allocated feedback mode at an allocated timing at a CoMP UE in a cellular mobile communication system using JT.

To implement JT, a UE needs to feed back channel information in the case of simultaneous transmission from some cells of a measurement set as well as channel information for each cell of the measurement set to a BS. Aside from channel information for each cell, an RI, PMI, wCQI, and sCQI based on cooperation between cells are referred to as a JT_RI, JT_PMI, JT_wCQI, and JT_sCQI, respectively. The UE feeds back all or a part of the cooperation information to the BS. Specifically, the JT_RI is not included in the feedback information because the BS can estimate the JT_RI based on the channel information for each cell. Additionally, the JT_PMI is configured to include only phase difference information between cells that consider cooperation, rather than being configured to be a PMI for JT. If the JT_wCQI and the JT_sCQI are generically called a JT_CQI, this value is a CQI needed for a cooperation situation or a CQI difference between a cooperation case and a non-cooperation case. When the JT_CQI is defined as a CQI difference, it is defined commonly or separately for two codewords, like a delta_DB-CQI defined in the third embodiment of the present invention.

Like a DB-CQI, channel information for coordinated transmission is encoded and transmitted jointly with individual feedbacks for cells of a measurement set at the same timing, or is fed back in a different feedback mode at a different timing from the individual feedbacks for the cells. The case of transmitting information for coordinated transmission together with individual feedbacks for the cells of a measurement set will be described. Both or either of the JT_CQI and JT_PMI are transmitted while the JT_RI is not transmitted.

In accordance with the fourth embodiment of the present invention, when a JT feedback is transmitted at the same timing as a DS-CQI for an individual cell, the BS indicates a measurement set and a plurality of subsets of the measurement set to the UE and allocates a feedback mode and timing to each subset as in the third embodiment of the present invention. The difference between the fourth embodiment and the third embodiment of the present invention is that a DB-CQI is replaced with a JT-CQI/JT-PMI in each feedback. For example, if the measurement set is {Cell-1, Cell-2, Cell-3, Cell-4} and the BS needs channel information about two UE-preferred cells selected from the measurement set and a JT feedback based on cooperation between the cells, the BS allocates two feedback modes and timings to the UE and indicates a subset of the measurement set corresponding to the feedback modes and timings to the UE. In this example, the two feedback modes and timings and the subset are set as follows:

Example 8 feedback allocation 1: (Mode A, $N_{pd}=10$, $M_{RI}=2$, $M_{PI}=2$, $N_{OFFSET,CQI}=0$, $N_{OFFSET,RI}=-1$, $N_{OFFSET,PI}=-1$, {Cell-1, Cell-2, Cell-3, Cell-4})

feedback allocation 2: (Mode E, $N_{pd}=10$, $M_{RI}=2$, $M_{PI}=2$, $N_{OFFSET,CQI}=3$, $N_{OFFSET,RI}=-1$, $N_{OFFSET,PI}=-1$, {Cell-1, Cell-2, Cell-3, Cell-4}, feedback allocation 1)

In Example 8, Mode A is identical to Mode A defined in Example 2, meaning that the UE needs to feedback a conventionally transmitted RI, PMI and CQI and a PI. Mode E is a mode indicating additional transmission of a JT feedback in Mode A. In Mode E, the UE feeds back a JT feedback based on cooperation between a cell corresponding to a PI selected in the indicated feedback allocation 1 and a cell to be selected in feedback allocation 2 to the BS at a CQI transmission timing. Accordingly, when Mode E is indicated as the feedback mode, the index of a feedback allocation for which cooperation is indicated to the UE and the feedback allocation index is directly signaled to the UE by the BS through higher-layer signaling or is preset to feedback allocation 1. The JT_CQI/JT-PMI is then fed back with a DS-CQI in a transmission period of $N_{pd}$ with an offset of $N_{OFFSET,CQI}$.

Figure 13:
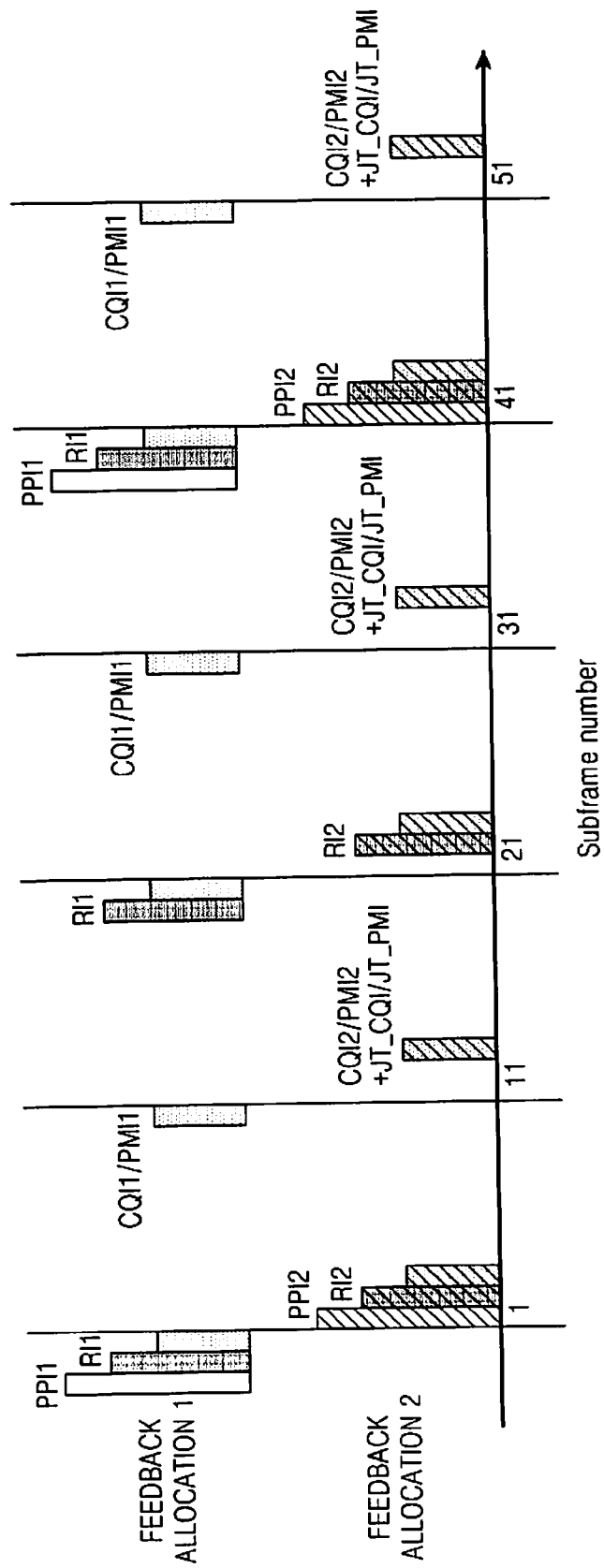
FIG. 13 illustrates feedback timings of a UE according to a fourth embodiment of the present invention.

FIG. 13 illustrates feedback transmission timings and feedback information of a UE in two feedback allocations regarding Example 8. Example 8 is an extension of the conventional Mode 1-1. When Mode 2-1 is extended, the BS additionally transmits K to the UE. The period of a PI is set to an $M_{PI}$ multiple of an RI period and the offset of the PI is set to the sum of an RI offset and $N_{OFFSET,PI}$. Or, the PI is jointly encoded with the RI and transmitted together without defining an additional PI timing. The period and offset of a PI for a wCQI are defined respectively as an $M_{PI}$ multiple of the period of the wCQI and the sum of the offset of the wCQI and $N_{OFFSET,PI}$, respectively. In an extension of Mode 2-1, both a JT_wCQI and a JT_sCQI are defined and transmitted together with a DS-CQI, or one of the JT_wCQI and the JT_sCQI is defined and transmitted together with a DS-CQI at a given timing. In a feedback mode for 8 CSI-RS antenna ports, which additionally includes two types of PMIs and two types of PTIs, the UE additionally feeds back a PI and a JT_CQI/JT_PMI in the conventional feedback structure in the same manner as in Example 8.

In another example, if the measurement set is {Cell-1, Cell-2, Cell-3, Cell-4} and the BS wants to receive channel information about two UE-preferred cells selected from the measurement set, to receive a JT feedback based on cooperation between the cells, and to receive a JT_CQI/JT_PMI at a different timing from a DS-CQI, the BS configures two feedback modes, timing information about the transmission timing of the JT_CQI/JT_PMI, and a subset of the measurement set corresponding to the feedback modes and timing, as follows.

Example 9 feedback allocation 1: (Mode A, $N_{pd}=10$, $M_{RI}=2$, $M_{PI}=2$, $N_{OFFSET,CQI}=0$, $N_{OFFSET,RI}=-1$, $N_{OFFSET,PI}=-1$, {Cell-1, Cell-2, Cell-3, Cell-4})

feedback allocation 2: (Mode F, $N_{pd}=10$, $M_{RI}=2$, $M_{PI}=2$, $H''=2$, $N_{OFFSET,CQI}=3$, $N_{OFFSET,RI}=-1$, $N_{OFFSET,PI}=-1$, {Cell-1, Cell-2, Cell-3, Cell-4}, feedback allocation 1)

Figure 14:
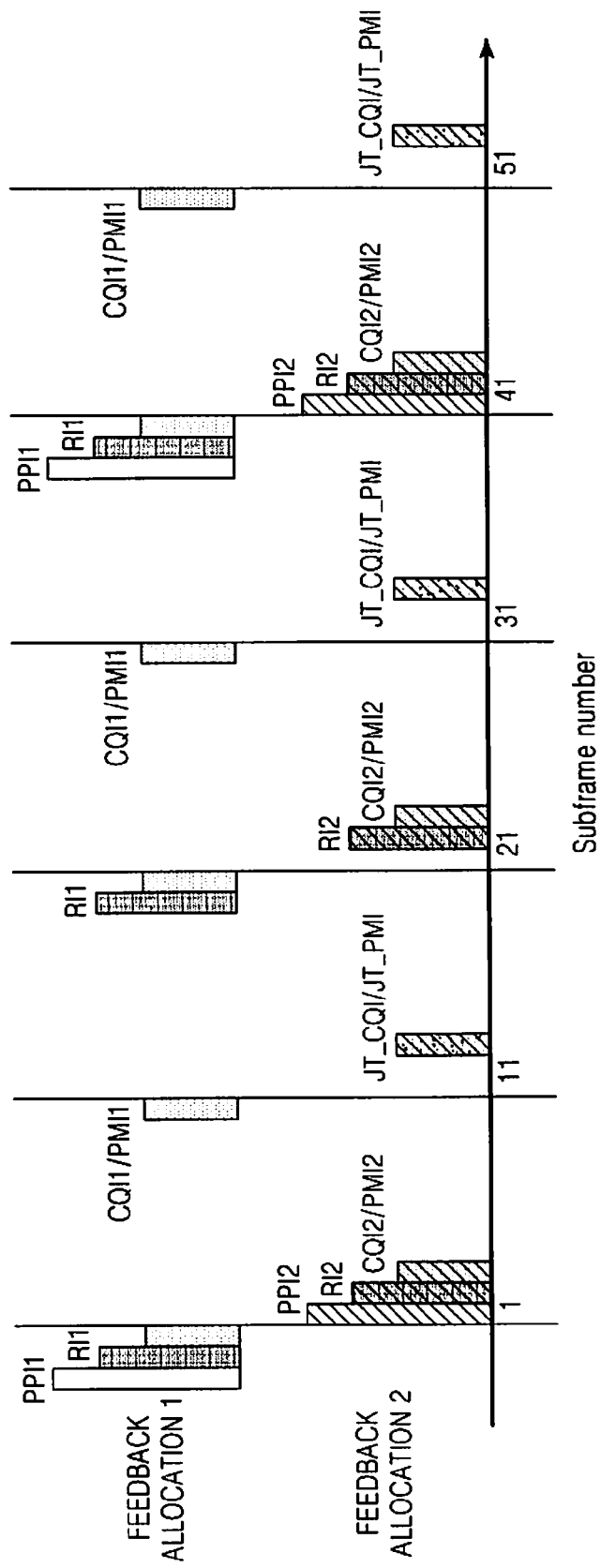
FIG. 14 illustrates feedback timings of a UE according to the fourth embodiment of the present invention.

In Example 9, Mode F includes a parameter H" indicating the period of a JT_CQI/JT_PMI, compared to Mode E in Example 8. The transmission period and offset of the JT_CQI/JT_PMI are set to $H''\cdot N_{pd}$ and $N_{OFFSET,CQI}$, respectively. That is, in a situation in which a DS-CQI is transmitted in a period of $N_{pd}$, a JT_CQI/JT_PMI is transmitted every H" times. FIG. 14 illustrates feedback transmission timings and feedback information of a UE in two feedback allocations, with respect to Example 9. Example 9 is an extension of the conventional Mode 1-1. When Mode 2-1 is extended, the BS additionally transmits K to the UE. Likewise, the period of a PI is set to an $M_{PI}$ multiple of an RI period and the offset of the PI is set to the sum of an RI offset and $N_{OFFSET,PI}$. Or, the PI is jointly encoded with the RI and transmitted together without defining an additional PI timing. The period and offset of a PI for a wCQI are defined respectively as an $M_{PI}$ multiple of the period of the wCQI and the sum of the offset of the wCQI and $N_{OFFSET,PI}$. In an extension of Mode 2-1, both a JT_wCQI and a JT_sCQI are defined and transmitted together with a DS-CQI, or only one of the JT_wCQI and the JT_sCQI is defined and transmitted together with a DS-CQI at a given timing. The transmission timing of the JT_sCQI is set such that (H–1) DB-sCQIs are transmitted at an interval of $N_{pd}$ subframes after a timing of the transmission period of a JT_wCQI, $H''\cdot N_{pd}$ and its offset $N_{OFFSET,CQI}$. In a feedback mode for 8 CSI-RS antenna ports, which additionally includes two types of PMIs and two types of PTIs, the UE additionally feeds back a JT_CQI/JT_PMI in the conventional feedback structure in the same manner as in Example 9.

Channel information for coordinated transmission is fed back in a different mode at a different timing from an individual feedback for each cell. For instance, if the measurement set is {Cell-1, Cell-2, Cell-3, Cell-4} and the BS wants to receive channel information about two UE-preferred cells selected from the measurement set, to receive a JT feedback based on cooperation between the cells, and to receive the JT feedback separately from channel information for each cell, the BS configures two feedback modes for individual cell feedbacks, and one feedback mode for JT, as follows.

Example 10 feedback allocation 1: (Mode A, $N_{pd}=10$, $M_{RI}=2$, $M_{PI}=2$, $N_{OFFSET,CQI}=0$, $N_{OFFSET,RI}=-1$, $N_{OFFSET,PI}=-1$, {Cell-1, Cell-2, Cell-3, Cell-4})

feedback allocation 2: (Mode A, $N_{pd}=10$, $M_{RI}=2$, $M_{PI}=2$, $N_{OFFSET,CQI}=3$, $N_{OFFSET,RI}=-1$, $N_{OFFSET,PI}=-1$, {Cell-1, Cell-2, Cell-3, Cell-4})

feedback allocation 3: (Mode G, $N_{pd}=10$, $M_{RI}=2$, $N_{OFFSET,CQI}=6$, $N_{OFFSET,RI}=-1$, {feedback allocation 1, feedback allocation 2})

In Example 10, Mode G is a mode in which a JT_RI, JT_PMI and JT_CQI are transmitted as feedback information based on JT between cells selected from feedback allocation 1 and feedback allocation 2. For the JT feedback, feedback periods and offsets are set as in the conventional Mode 1-1 and a feedback allocation number for JT is also set. The feedback allocation number is signaled separately to the UE. Or the feedback allocation number is for cooperation between predetermined feedback allocation numbers or between predetermined cells. A JT_RI is not fed back and only a JT_PMI and a JT_CQI are transmitted. Thus, $M_{RI}$ and $N_{OFFSET,RI}$ are not set.

Figure 15:
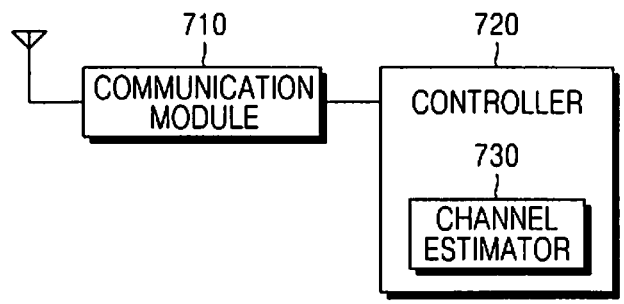
FIG. 15 is a block diagram of a UE according to an embodiment of the present invention.

FIG. 15 is a block diagram illustrating a UE according to an embodiment of the present invention.

Referring to FIG. 15, the UE includes a communication module 710 and a controller 720.

The communication module 710 transmits or receives data externally. The communication module 710 transmits channel information for CoMP to a central control device under the control of the controller 720.

The controller 720 controls the states and operations of all components in the UE. The controller 720 selects feedback information for the best cell or coordinated communication according to the communication states between the UE and cells and feed back channel information about the selected cell to the central control device. For this purpose, the controller 720 includes a channel estimator 730.

The channel estimator 730 determines feedback information on a CSI-RS basis according to CoMP set information and feedback mode information received from the central control device and estimates channels using received CSI-RSs. The channel estimator 730 feeds back CoMP-related channel information to the central control device by controlling the communication module 710.

While the UE is shown as including the communication module 710 and the controller 720, the UE is not limited to the specific configuration. That is, the UE further includes many other components according to its functions. For example, the UE additionally includes a display for displaying the current state of the UE, an input unit for receiving a signal such as a function execution command from a user, a memory for storing data generated from the UE, etc.

Figure 16:
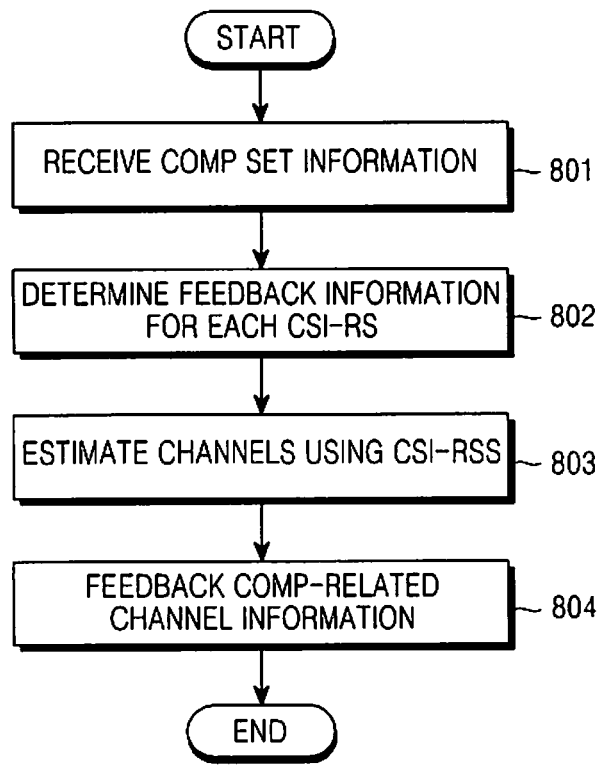
FIG. 16 is a flowchart illustrating an operation of the UE according to an embodiment of the present invention.

FIG. 16 is a flowchart illustrating an operation of the UE according to an embodiment of the present invention.

Referring to FIG. 16, the UE receives CoMP set information and feedback mode information from the central control device in step 801 and determines necessary feedbacks on a CSI-RS basis based on the received information in step 802. In step 803, the UE estimates channels using CSI-RSs based on the determined feedbacks. The UE then feeds back CoMP-related channel information to the central control device according to the channel estimation result in step 804.

Figure 17:
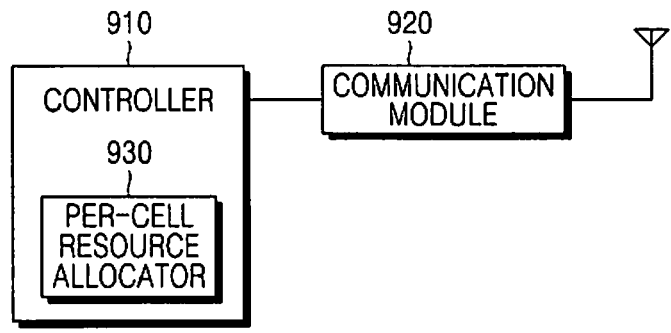
FIG. 17 is a block diagram of a central control device according to an embodiment of the present invention.

FIG. 17 is a block diagram of a central control device according to an embodiment of the present invention.

The central control device includes a controller 910 and a communication module 920.

The controller 910 controls the states and operations of all components in the central control device. The controller 910 allocates CSI-RSs to resources on a cell basis, for channel estimation at the UE, allocates a CoMP set when needed, and transmits CoMP set information to the UE. For this purpose, the controller 910 further includes a per-cell resource allocator 930.

The per-cell resource allocator 930 allocates resources to CSI-RSs for channel estimation at the UE on a cell basis and transmits CSI-RSs in the allocated resources through the communication module 920. Resources for each cell are allocated in correspondence with CSI-RSs for channel estimation.

The communication module 920 transmits and receives data to and from the UE or a managed cell. The communication module 920 transmits CSI-RSs to the UE in the allocated resources and receives feedback information under the control of the controller 910.

Figure 18:
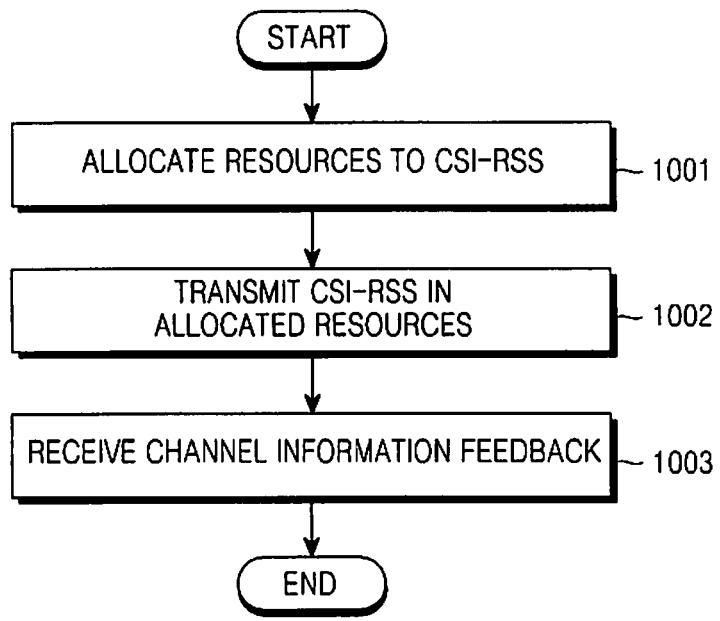
FIG. 18 is a flowchart illustrating an operation of the central control device according to an embodiment of the present invention.

FIG. 18 is a flowchart illustrating an operation of the central control device according to an embodiment of the present invention.

Referring to FIG. 18, the central control device allocates resources to CSI-RSs for channel estimation of a UE on a cell basis in step 1001, and transmits CSI-RSs in the resources to the UE in step 1002. In step 1003, the central control device receives feedback information including channel information from the UE.

As is apparent from the above description of the present invention, in the case in which DB and JT are used, an effective feedback can be performed by setting the types, periods, and timings of feedback information, taking into account multi-CSI feedbacks in an LTE-A CoMP system where a plurality of BSs supports coordinated downlink transmission to a UE.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method for transmitting feedback information by a user equipment (UE) in a mobile communication system, the method comprising:
   receiving information about at least one channel state information reference signal (CSI-RS), information about at least one interference measurement resource (IMR), information about at least one CSI feedback representative of combination of a transmission period and an offset, and at least one CSI feedback index being mapped to the information about at least one IMR and the information about at least one CSI-RS;
   deriving the at least one CSI feedback from channel measurement based on the information about at least one CSI-RS and interference measurement based on the information about at least one IMR;
   and
   transmitting the at least one CSI feedback using the information about at least one CSI feedback representative of the combination of the transmission period and the offset.

2. The method of claim 1, further comprising:
   receiving information about a mode representative of information in a CSI feedback,
   wherein the information in the CSI feedback is one or combination of at least two among a wideband channel quality indicator (wCQI), a subband CQI (sCQI), a wideband precoding matrix index (wPMI), a subband PMI (sPMI), a rank indicator (RI), and a precoding type indicator (PTI).

3. The method of claim 1, further comprising:
   in case of collision between CSI feedbacks corresponding to different CSI feedback indexes, dropping CSI feedbacks corresponding to all CSI feedback indexes except a CSI feedback with a lowest CSI feedback index.

4. The method of claim 1, further comprising:
   in case of collision between CSI feedbacks with feedback types of different priorities, dropping CSI feedbacks corresponding to all CSI feedback indexes except a CSI feedback with a higher priority.

5. The method of claim 1, wherein a rank indicator (RI) of another CSI feedback is same as a RI of a reference CSI feedback.

6. A method for receiving feedback information by a central control device in a mobile communication system, the method comprising:
   transmitting, to a user equipment (UE), information about at least one channel state information reference signal (CSI-RS), information about at least one interference measurement resource (IMR), information about at least one CSI feedback representative of combination of a transmission period and an offset, and at least one CSI feedback index being mapped to the information about at least one IMR and the information about at least one CSI-RS;
   and
   receiving the at least one CSI feedback from the UE,
   wherein the at least one CSI feedback is derived from channel measurement based on the information about at least one CSI-RS and interference measurement based on the information about at least one IMR, and
   wherein the at least one CSI feedback is transmitted by using the information about at least one CSI feedback representative of the combination of the transmission period and the offset.

7. The method of claim 6, further comprising:
   transmitting, to the UE, information about a mode representative of information in a CSI feedback,
   wherein the information in the CSI feedback is one or combination of at least two among a wideband channel quality indicator (wCQI), a subband CQI (sCQI), a wideband precoding matrix index (wPMI), a subband PMI (sPMI), a rank indicator (RI), and a precoding type indicator (PTI).

8. The method of claim 6, wherein, in case of collision between CSI feedbacks corresponding to different CSI feedback indexes, CSI feedbacks corresponding to all CSI feedback indexes except a CSI feedback with a lowest CSI feedback index are dropped.

9. The method of claim 6, wherein, in case of collision between CSI feedbacks with feedback types of different priorities, CSI feedbacks corresponding to all CSI feedback indexes except a CSI feedback with a higher priority are dropped.

10. The method of claim 6, wherein a rank indicator (RI) of another CSI feedback is same as a RI of a reference CSI feedback.

11. A user equipment (UE) in a mobile communication system, the UE comprising:
    a receiver configured to receive information about at least one Channel State Information Reference Signal (CSI-RS) information about at least one interference measurement resource (IMR), information about at least one CSI feedback representative of combination of a transmission period and an offset, and at least one CSI feedback index being mapped to the information about at least one IMR and the information about at least one CSI-RS; and
    a controller configured to derive the at least one CSI feedback from channel measurement based on the information about at least one CSI-RS and interference measurement based on the information about at least one IMR; and a transmitter configured to transmit the at least one CSI feedback using the information about at least one CSI feedback representative of the combination of the transmission period and the offset.

12. The UE of claim 11, wherein the receiver is configured to receive information about a mode representative of information in a CSI feedback, and
wherein the information in the CSI feedback is one or combination of at least two among a wideband channel quality indicator (wCQI), a subband CQI (sCQI), a wideband precoding matrix index (wPMI), a subband PMI (sPMI), a rank indicator (RI), and a precoding type indicator (PTI).

13. The UE of claim 11, wherein, in case of collision between CSI feedbacks corresponding to different CSI feedback indexes, the controller is configured to drop CSI feedbacks corresponding to all CSI feedback indexes except a CSI feedback with a lowest CSI feedback index.

14. The UE of claim 11, wherein, in case of collision between CSI feedbacks with feedback types of different priorities, the controller drops CSI feedbacks corresponding to all CSI feedback indexes except a CSI feedback with a higher priority.

15. The UE of claim 11, wherein a rank indicator (RI) of other CSI feedback is same as a RI of a reference CSI feedback.

16. A central control device in a mobile communication system, the central control device comprising:
a transmitter configured to transmit, to a user equipment (UE), information about at least one channel state information reference signal (CSI-RS), information about at least one interference measurement resource (IMR), information about at least one CSI feedback representative of combination of a transmission period and an offset, and at least one CSI feedback index being mapped to the information about at least one IMR and the information about at least one CSI-RS; and a receiver configured to receive at least one CSI feedback from the UE,
wherein the at least one CSI feedback is derived from channel measurement based on the information about at least one CSI-RS and interference measurement based on the information about at least one IMR, and
wherein the at least one CSI feedback is transmitted by using the information about at least one CSI feedback representative of the combination of the transmission period and the offset.

17. The central control device of claim 16, wherein the transmitter is configured to transmit, to the UE, information about a mode representative of information in a CSI feedback, and
wherein the information in the CSI feedback is one or combination of at least two among a wideband channel quality indicator (wCQI), a subband CQI (sCQI), a wideband precoding matrix index (wPMI), a subband PMI (sPMI), a rank indicator (RI), and a precoding type indicator (PTI).

18. The central control device of claim 16, wherein, in case of collision between CSI feedbacks corresponding to different CSI feedback indexes, CSI feedbacks corresponding to all CSI feedback indexes except a CSI feedback with a lowest CSI feedback index are dropped.

19. The central control device of claim 16, wherein, in case of collision between CSI feedbacks with feedback types of different priorities, CSI feedbacks corresponding to all CSI feedback indexes except a CSI feedback with a higher priority are dropped.

20. The central control device of claim 16, wherein a rank indicator (RI) of other CSI feedback is same as a RI of a reference CSI feedback.

* * * * *